United States Patent
Klein

(10) Patent No.: US 6,374,532 B1
(45) Date of Patent: Apr. 23, 2002

(54) SPORTING APPARATUS SUITED FOR FISHING AND HUNTING

(76) Inventor: Darrel J. Klein, R.R. 2, Box 17, Breckenridge, MN (US) 56520

(*) Notice: Subject to any disclaimer, the term of this patent is extended or adjusted under 35 U.S.C. 154(b) by 0 days.

(21) Appl. No.: 09/436,039

(22) Filed: Nov. 8, 1999

Related U.S. Application Data

(63) Continuation-in-part of application No. 08/959,801, filed on Oct. 29, 1997, now Pat. No. 6,170,189.

(51) Int. Cl.[7] .................. A01K 97/06; A01K 97/10; A01K 97/12
(52) U.S. Cl. .................. 43/17; 43/21.2; 43/54.1
(58) Field of Search .................. 43/17, 17.5, 21.2, 43/54.1

(56) References Cited

U.S. PATENT DOCUMENTS

| | | | |
|---|---|---|---|
| 1,621,017 A | | 3/1927 | Joyal |
| 2,264,744 A | | 12/1941 | Dunnam |
| 2,693,046 A | * | 11/1954 | Langevin .................. 43/17 |
| 2,817,176 A | | 12/1957 | Harshbarger |
| 3,060,616 A | | 10/1962 | Woodley |
| 3,147,563 A | | 9/1964 | Molter |
| 3,213,561 A | | 10/1965 | Roemer |
| 3,389,489 A | | 6/1968 | Burns |
| 3,739,514 A | | 6/1973 | Odney |
| 4,353,182 A | * | 10/1982 | Junkas et al. .................. 43/54.1 |
| 4,471,554 A | | 9/1984 | Heiskell |
| 4,586,284 A | | 5/1986 | Westwood |
| 4,633,608 A | | 1/1987 | Savarino |
| 5,107,614 A | * | 4/1992 | Gonnello .................. 43/17 |
| 5,203,815 A | * | 4/1993 | Miller .................. 43/21.2 |
| 5,269,088 A | | 12/1993 | Slaback, Jr. et al. |
| 5,274,944 A | | 1/1994 | Laessig |
| 5,339,558 A | | 8/1994 | Monson |
| 5,448,849 A | | 9/1995 | Burgett |
| 5,448,850 A | | 9/1995 | Gonnello |
| 5,488,796 A | | 2/1996 | Taylor et al. |
| 5,564,213 A | | 10/1996 | Rinehart |

* cited by examiner

Primary Examiner—Robert P. Swiatek
(74) Attorney, Agent, or Firm—James V. Harmon

(57) ABSTRACT

A sporting apparatus, one aspect of which is a tackle box having a tackle box body and a cover with multiple mounting members on the tackle box for mounting a reel supporting rod having a reel at its upper end. A transport cart upon which the tackle box can be supported includes wheels and a handle for allowing the tackle box to be pulled by a person while supported within the cart. Another aspect concerns a resilient seat assembly that is removably mounted on the tackle box. The tackle box or a tray contained therein or other components are provided with mounting structure for holding these items on a supporting article such as a pail. The reel can be repositioned for being supported by a plurality of legs or a tripod for holding the reel in vertical alignment with a fishing hole in the ice surface, with the reel then mounted on the lower end of a tube that can be raised or lowered vertically to move it to a selected position within the water or above the ice surface and then clamped in place.

22 Claims, 17 Drawing Sheets

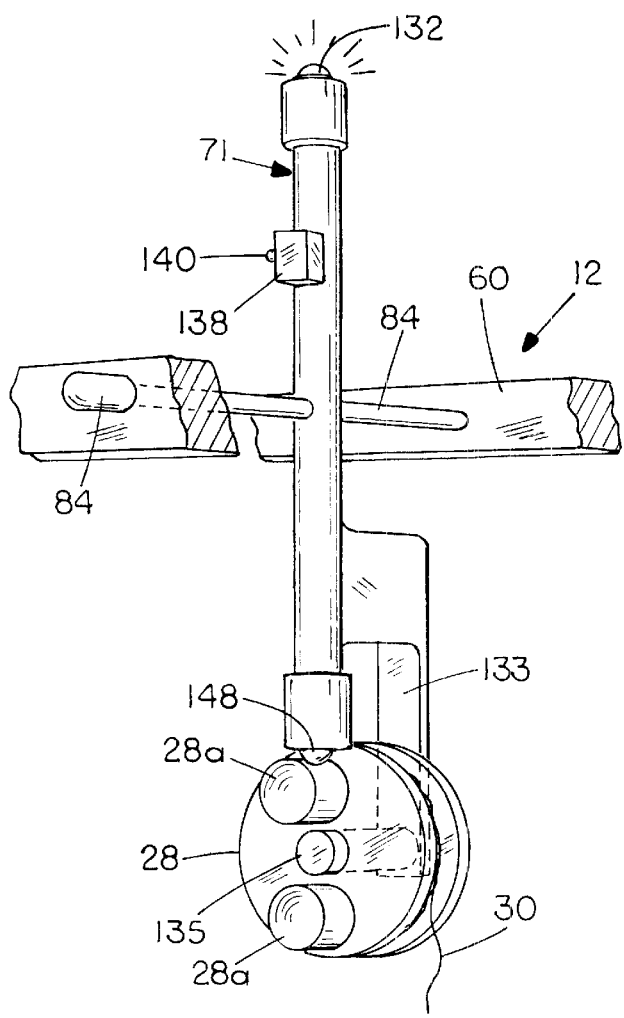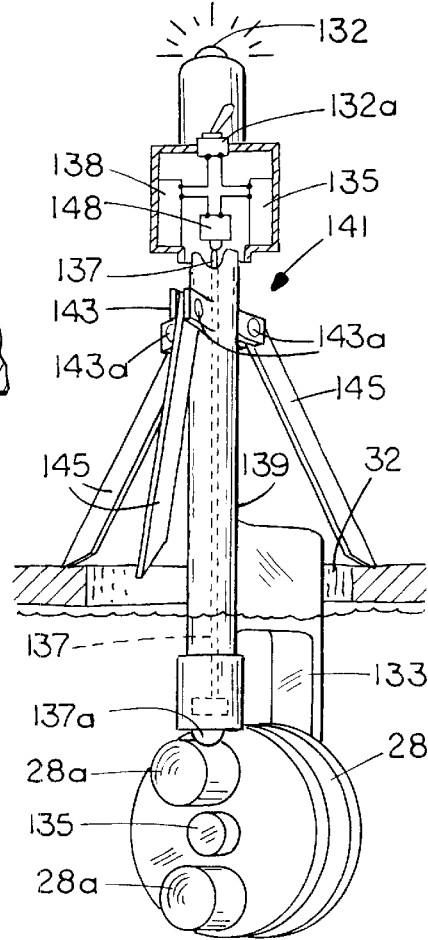
FIG. 12          FIG. 12A
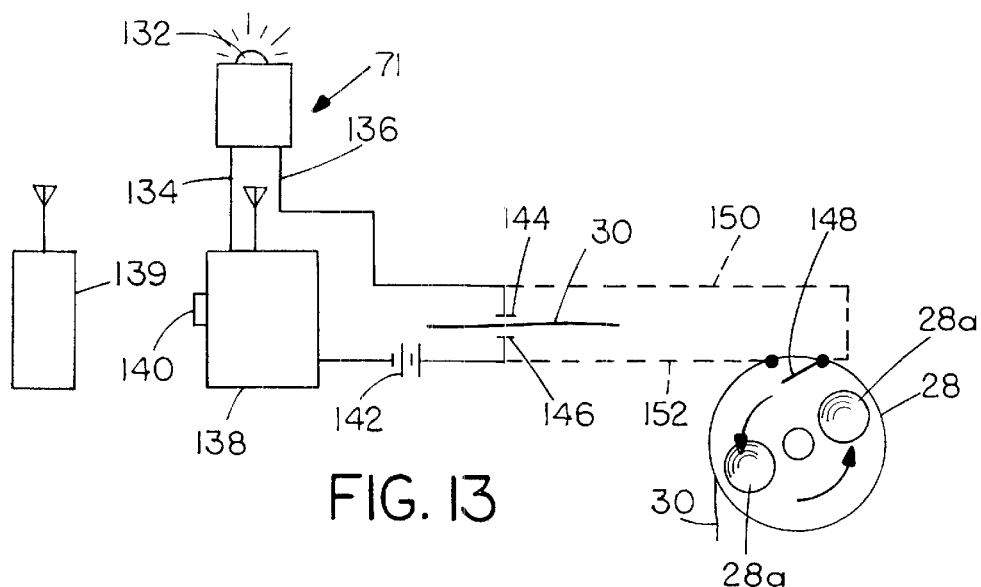
FIG. 13

SPORTING APPARATUS SUITED FOR FISHING AND HUNTING

This isa continuation-in-part of application Ser. No. 08/959,801, filed Oct. 29, 1997 and now U.S. Pat. No. 6,170,189.

FIELD OF THE INVENTION

This invention relates to sporting equipment and more particularly to a sporting apparatus suited for fishing and hunting.

BACKGROUND OF THE INVENTION

The general objective of the present invention is to provide a supporting apparatus that can serve as an improved fishing reel holder that can be used for any kind of fishing but is particularly well suited for ice fishing, i.e., fishing on a frozen lake through an opening in the ice. While fishing devices have been previously proposed for this purpose, the fisherman often becomes uncomfortable because there is no place to sit and the fishing equipment is of no assistance in this regard. One object of the invention is thus to provide a fishing reel holder that can also be used as a seat for the fisherman.

Prior fishing equipment is not well suited for supporting a conventional fishing rod as well as a separate ice fishing reel. Accordingly, another object of the invention is to provide a fishing reel holder that can be used for simultaneously supporting a fishing reel of the kind used for ice fishing as well as a conventional fishing rod.

Another object is to provide a way of supporting a fishing reel holder in any of several positions, e.g., horizontally close to the surface of the ice, on the ground at the edge of a lake, or in a vertical position mounted on a wall, e.g., the inside wall of a fish house, at various angles.

A further object is to provide a reel holder with a warning or alarm system that can be used to signal the presence of a fish on the line but which can be removed if desired and used for other purposes such as hunting or even as a burglar alarm to indicate that a burglar has entered the fish house.

Yet another object is to provide a fishing reel holder that can serve as a table in a fish house for supporting various objects, e.g., beverage cups, etc., or can be used as a surface for cleaning and filleting fish.

Another object is to provide a fishing reel holder that serves as a tackle box.

Still another object is to provide an alarm that can be mounted in various positions for sensing and informing the fisherman of a fish on the line.

It is also an object to provide a support for an electronic alarm with an optional light switch for indicating the presence of fish or game.

Another object of the invention is to provide a fishing reel holder including an alarm with a motion detector that includes either a mechanical switch or a proximity switch for activating the alarm.

Yet another object is to provide a way of supporting the reel so as to enhance the oscillatory action of the lure.

Another object is to provide an apparatus suited for fishing that can also be used in hunting for supporting a firearm.

These and other more detailed and specific objects of the present invention will be better understood by reference to the following figures and detailed description which illustrate by way of example but a few of the various forms of the invention within the scope of the appended claims.

SUMMARY OF THE INVENTION

This invention concerns sporting equipment, especially a reel holder for ice fishing which can be used without the reel for hunting. The fishing reel holder includes a planar supporting base. The planar base has a top surface and a bottom surface. A reel-supporting arm is provided with an attached end and a free end. At least one receptacle is provided on the upper surface of the base for supporting the attached end of the reel-supporting arm. An arm holder is located on the base so as to extend above the upper surface of the base for contacting an intermediate portion of the arm to hold the arm at an oblique angle with respect to the base. A reel for holding fishing line is rotatably supported on the free end of the arm so that by raising or lowering the arm holder, the angle of the reel-supporting arm can be changed with respect to the base. Alternatively, the reel can be supported through an opening at the center of the base. In a preferred form of the invention, the reel is coupled to a mechanical or electrical alarm. The base can preferably be used as a seat by being supported on an article such as a pail. The opening in the center of the base can also contain a tackle box for fishing lures and the like.

Another feature of the invention comprises the alarm per se which can be suspended from the base or be provided with its own support, e.g. a built-in tripod for suspending the alarm above a fishing hole in the ice with the reel adjacent to and operatively associated with the alarm for energizing the alarm when the reel is rotated. The alarm can also be supported on other articles such as a fishing rod which serves as a base and connected to the fishing so that a sudden pull on the line or deflection of the rod will set off the alarm.

THE FIGURES

FIG. 12 is a perspective view of the invention showing the alarm of FIG. 6 in more detail.

FIG. 12A is a perspective view showing another way of supporting the alarm of FIG. 12.

FIG. 13 is a circuit diagram of the alarm of FIGS. 6 and 12.

DETAILED DESCRIPTION OF THE INVENTION

Refer now to the figures wherein the same numerals refer to corresponding parts in the several views.

Figure 1:
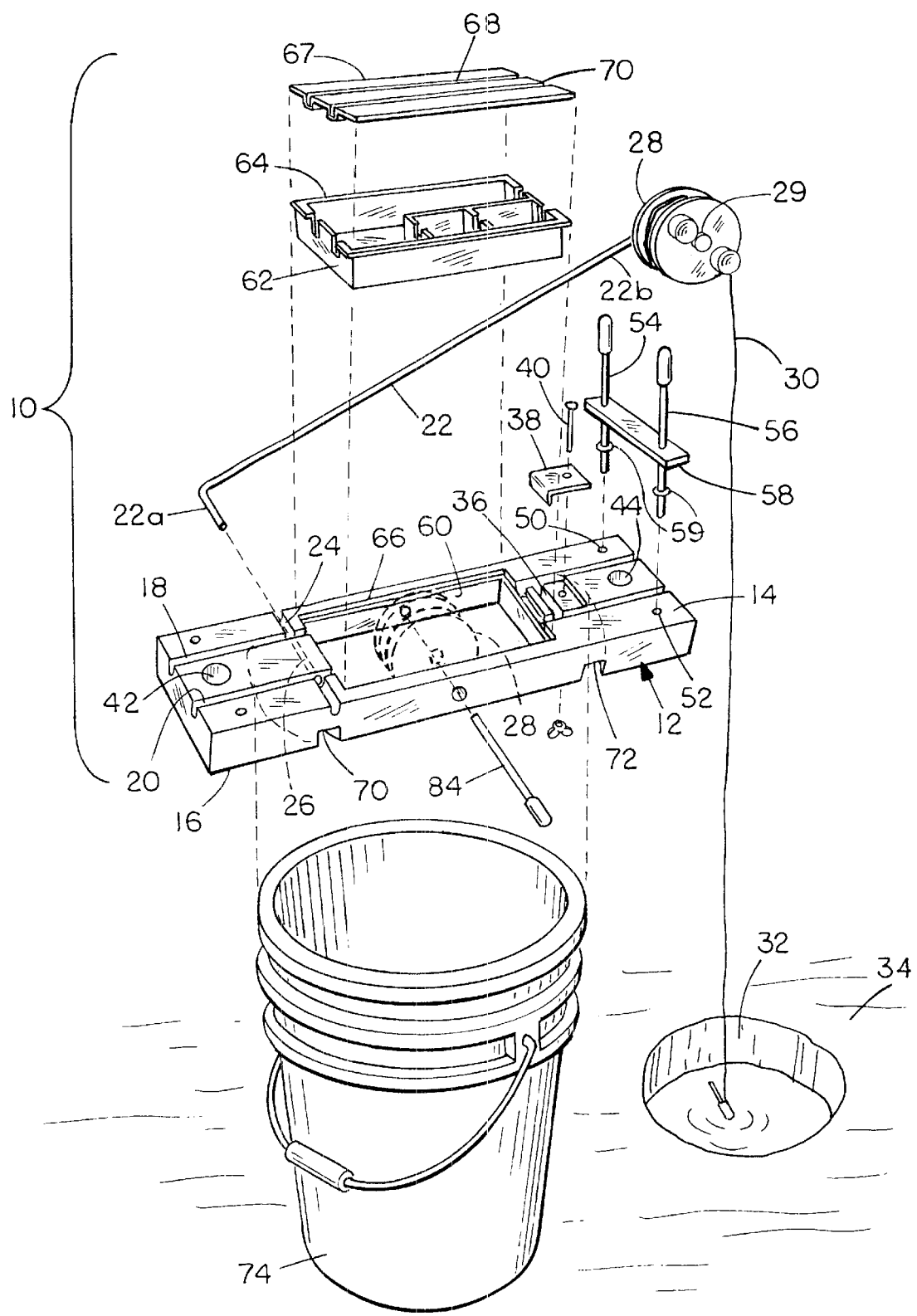
FIG. 1 is an exploded perspective view of the invention with seat cushion and table surface removed for clarity of illustration.
Figure 2:
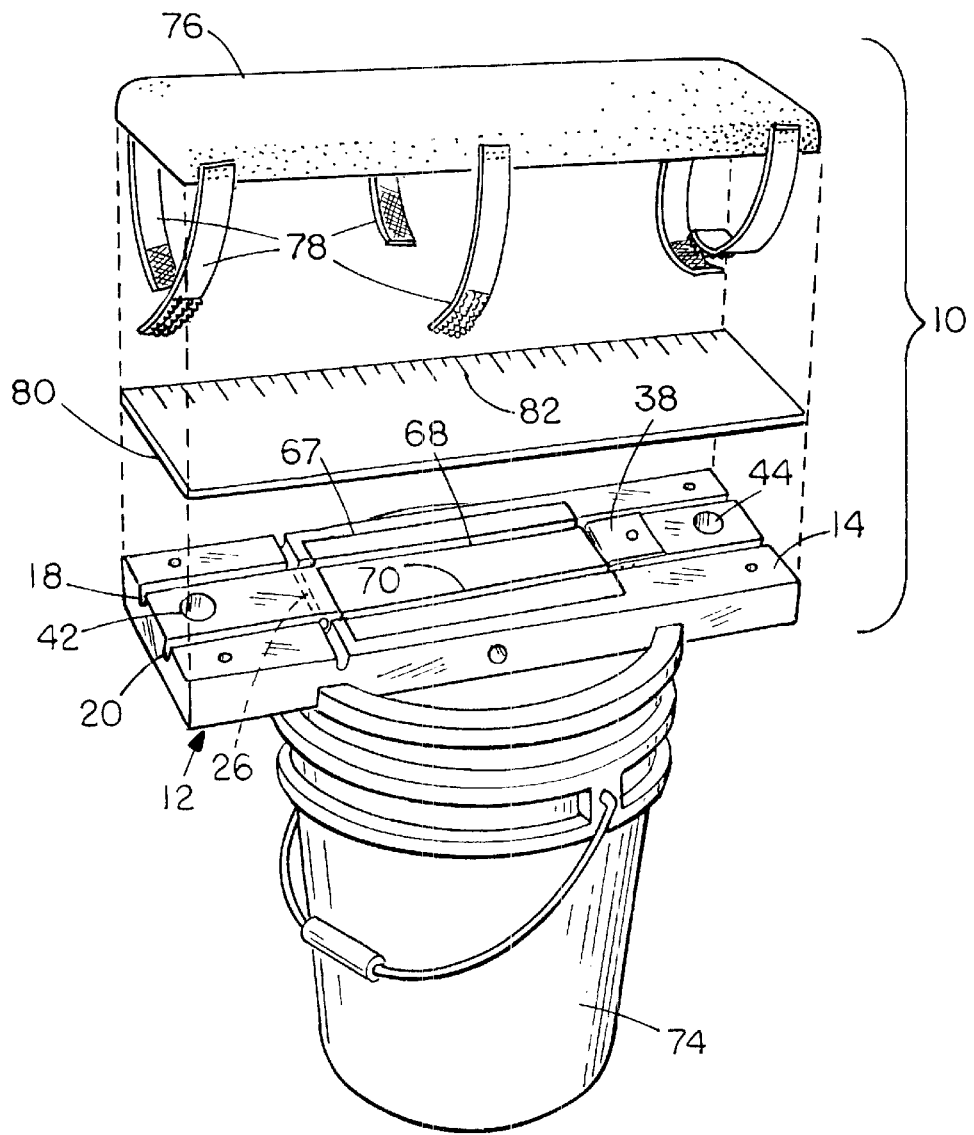
FIG. 2 is an exploded perspective view of the invention shown mounted on a pail with a seat cushion and table surface as they would appear just before being attached to the base shown in FIG. 1.
Figure 11:
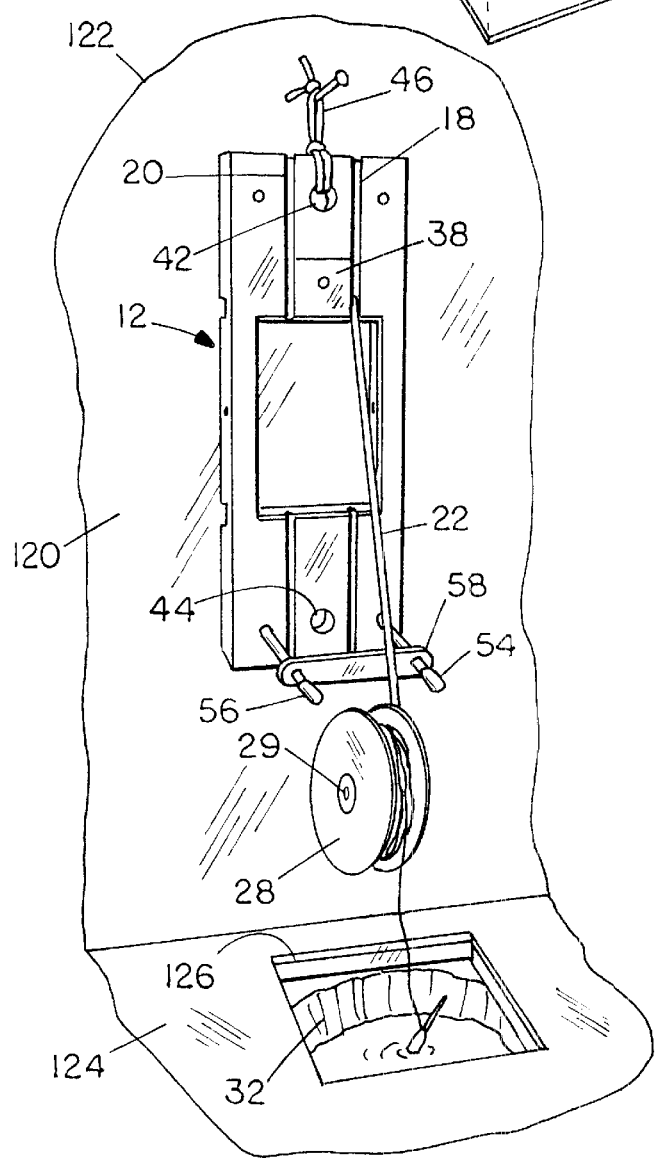
FIG. 11 is a perspective view of the invention as it appears with the base supported in a vertical position from the wall of a fish house.

As shown in FIGS. 1 and 2, the invention provides a fishing reel holder which is especially well suited for ice fishing. The fishing reel holder indicated generally at 10 includes a planar supporting base 12 that serves as a foundation or framework having an upper surface 14 and a lower surface 16. The base 12 is elongated and can be formed from a flat board of a sturdy wood such as oak or maple or of plastic, and is preferably generally rectangular in shape as shown, with a pair of longitudinally extending, laterally spaced apart grooves 18 and 20 in its upper surface 14 for storing one or more reel-supporting arms 22 when not in use. The upper surface 14 of the base 12 also has a transversely extending groove 24 communicating with a horizontally extending aligned passage 26 that serves as a receptacle for the laterally extending attached end portion 22a of the reel-supporting arm 22. The end portion 22a is pivotally mounted in the passage 26. A reel 28 is supported for rotation on the end piece 29 at the free end 22b of arm 22. The arm 22 can be made of metal, e.g., tubing, or reinforced plastic. The reel 28 holds a supply of fishing line 30 which during operation extends downwardly through a hole 32 in ice 34. In order to support the arm 22 in an alternate position, a second laterally extending passage or receptacle 36 is provided through the top of the base 12 at a location that is spaced apart from the receptacle 26, in this case relatively close to the right end of the base 12 for enabling the arm 22 to be held in a different position (as will be described below) or for two reel-supporting arms 22 to be used simultaneously, one with its attached end 22a located in the receptacle 26 and the other with its attached end 22a placed in the receptacle 36. The receptacle 36 can be closed above by means of a removable metal cover 38 that is held in place by a screw 40. Each end of the base 12 is provided with a bored opening 42, 44 for enabling the base 12 to be suspended in a vertical position, e.g., by connecting the base 12 to the wall of an ice house as shown in FIG. 11 which shows a short piece of rope 46 tied through the opening 42. The openings 42, 44 can also serve as sockets to support a yoke for other sporting equipment, e.g. for hunting or trap shooting, as will be described below in connection with FIG. 18.

Figure 5:
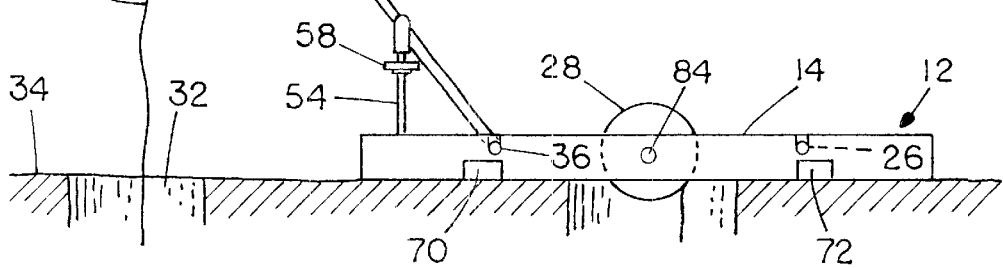
FIG. 5 is a side elevational view of the invention during use.
Figure 6:
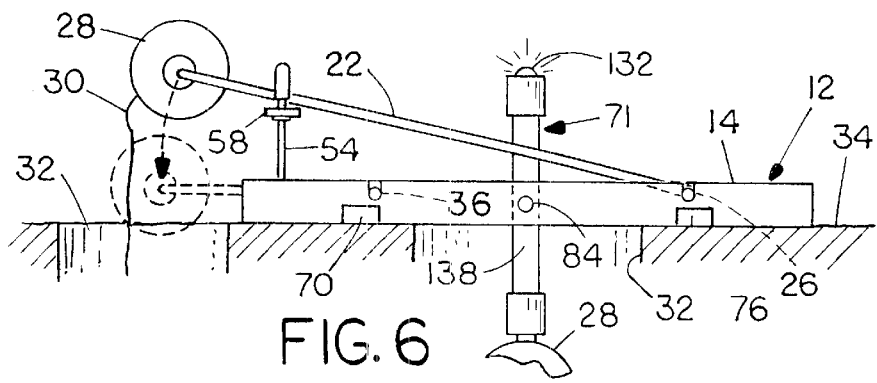
FIG. 6 is a view similar to FIG. 5 showing the reel and reel support arm in two different positions and the alarm mounted on the base.

At the right and left ends of the base 12 are pairs of upright sockets 50, 52 to receive vertically disposed, upwardly extending posts 54, 56 between which is connected an arm holder 58 for contacting and supporting a central portion of the reel-supporting arm 22, as best shown in FIGS. 5 and 6. By raising or lowering the holder 58, the angle of the arm 22 and the height of the reel 28 can be changed. Moreover, if the fisherman places the reel-supporting arm 22 in the receptacle 36, the arm 22 will be elevated at a steep angle relative to the base 12 (in FIG. 5 an angle of about 50 degrees) but as shown in FIG. 6 with the attached portion 22a of the arm 22 mounted in the receptacle 26, the arm 22 will be supported at a much lower angle, e.g., about 25 degrees with respect to the base 12. This enables the fisherman to adjust the height and angle of the arm 22 to best suit existing fishing conditions. The holder 58 can be formed from a rigid material such as metal but is preferably an elastic material such as rubber and can be held in place by suitable fasteners such as vertically adjustable metal rings having set screws or rubber O-rings 59 (FIG. 1) which can be moved up or down and will then stay in place. If the holder 58 is rubber, the resilient or yieldable support of the reel-supporting arm 22 provided by the resiliency of the rubber holder 58 will enhance oscillatory action of the lure connected to the fishing line 30 by enabling the arm 22 and reel 28 to bounce up and down during use while the fasteners 59 remain fixed in place.

At the center of the base 12 is provided an opening 60, in this case a rectangular opening, for receiving a tackle box 62 suitably sized and shaped to fit within the opening 60 and including a rim 64 of the appropriate size to fit into a peripheral groove or ledge 66 around the opening 60 to hold the tackle box 62 in place. The tackle box 62 is provided with a cover 67 having a pair of upwardly opening, longitudinally extending, laterally spaced apart parallel grooves 68, 70 which are aligned with the grooves 18, 20 to provide a storage recess for one or more of the reel-supporting arms 22 on the top surface 14 of the base 12 when the arms 22 are not in use. The base 12 thus serves as a tackle box as well as a support for the reel arm 22 and reel 28. The tackle box 62 can be provided with a carrying recessed in its top surface which can be extended by pulling it upwardly to facilitate carrying the tackle box.

Figure 3:
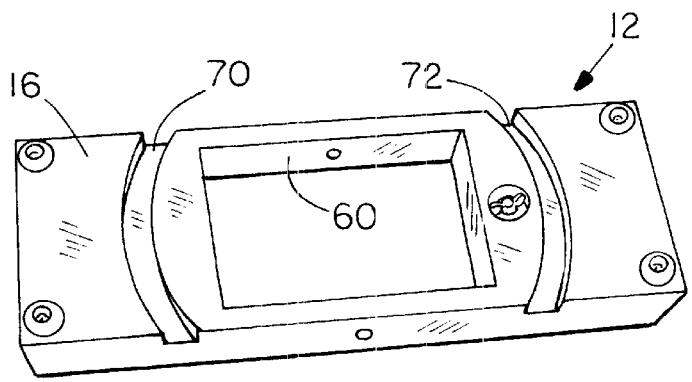
FIG. 3 is a perspective bottom view of the base of FIGS. 1 and 2.

As shown best in FIG. 3, the bottom 16 of the base 12 is provided with a pair of longitudinally spaced apart, laterally extending circular grooves 70 and 72 of an appropriate size to fit a standard-size plastic pail 74 which itself forms no part of the invention. A pail 74 is commonly taken to the fish house for carrying supplies and taking back the fish that have been caught. Whenever desired, the base 12 can be mounted on the pail 74 as shown in FIGS. 1 and 2. In FIG. 1 the invention is used for fishing while mounted on pail 74, but in FIG. 2 the invention is used as a seat through the provision of a removable seat cushion 76 of the same size and shape as the base 12 and including mounting straps 78 with fasteners at their ends, e.g., hook-and-loop fasteners such as Velcro® fasteners, for connecting the ends of the straps together around the bottom of the base 12. Between the base 12 and the seat cushion 76 is provided a removable table top that serves as a cutting board 80 of the same size and shape as the base 12 except for being much thinner. The cutting board 80 can be formed, for example, from quarter-inch plywood or quarter-inch plastic sheet, and is preferably provided with printed dimensions along one edge as shown at 82 to provide a ruler for measuring the length of the fish caught. The seat cushion 76 and the plate 80 which serves as a table, for clarity of illustration, are not shown in FIG. 1.

Figure 7:
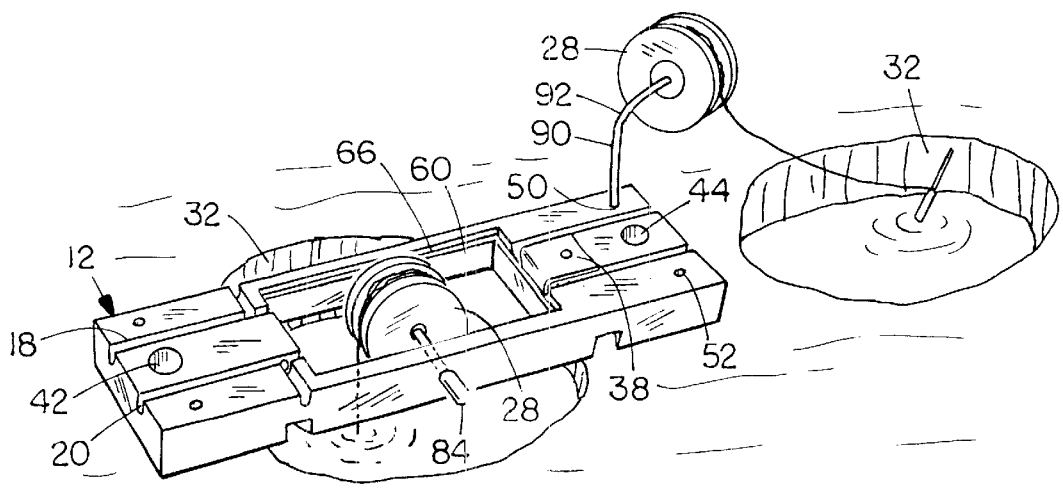
FIG. 7 is a perspective view of the invention in use with two reels supported on the base.

When the tackle box 62 is removed, a spindle 84 can be extended through laterally spaced apart holes on either side of the opening 60 to support the reel 28 in an alternate position at the center of the opening 60, as shown in FIGS. 1, 5 and 7 at the center of the base 12 above the fishing hole 32, with the ends of the base 12 supported on the ice 34 on either side of the fishing hole 32. When the fisherman requires a warning device, an alarm 71 is suspended in the opening 60 on the spindle 84 (FIGS. 6, 12 and 13). The alarm 71 will be described in more detail below.

By reference to FIG. 7, it will be seen that a reel support arm 90 formed from metal with a right-angle bend 92 at its center is supported in the socket 50 for holding an additional reel 28 adjacent to one end of the base 12 while a similar reel 28 is mounted on the spindle 84 in the central opening 60. Thus, the rod 90 supports the reel 28 rigidly in place, and the bend 92 holds the reel 28 at the end of the arm 90 so that it rotates about a horizontal axis.

Figure 4:
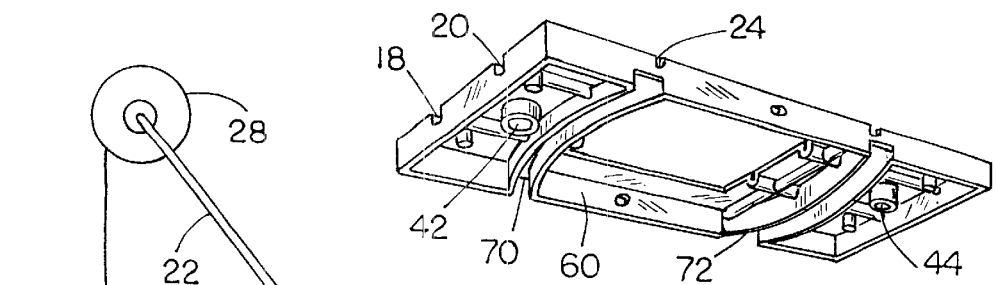
FIG. 4 is a bottom perspective view of the base as it appears when formed from plastic resin.

Refer now to FIG. 4 which illustrates a base 12 formed from plastic resin. As seen in FIG. 4, the base 12 is hollowed out on the bottom. The base 12 of FIG. 4 can be formed from any suitable plastic resin, e.g., polyethylene, polypropylene, vinyl plastic, polycarbonate resin, etc., and can be manufactured by standard injection molding techniques known to those skilled in the art. As already described, the tackle box 62 can be stored in the opening 60 molded in the center of the base 12.

Figure 8:
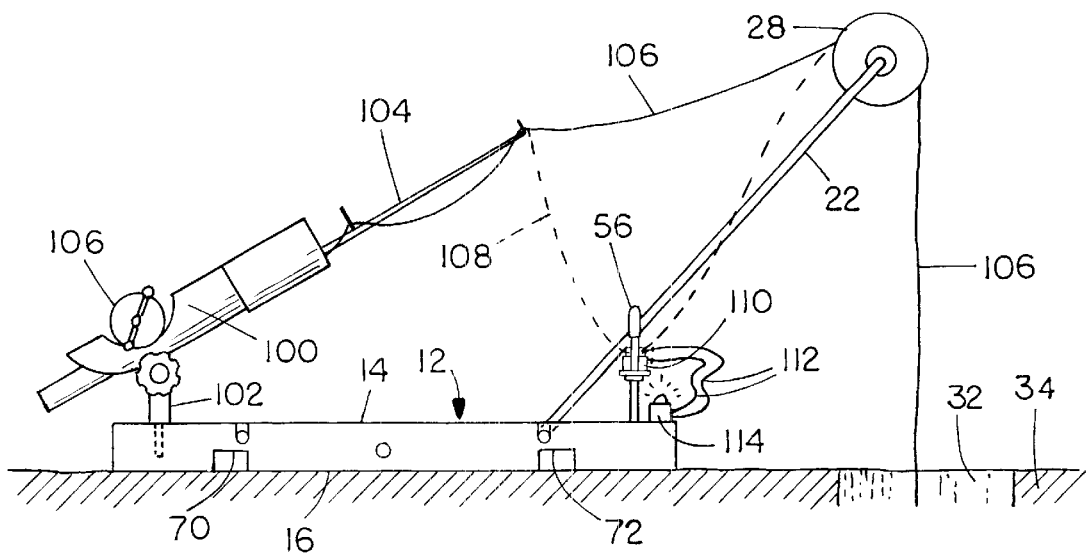
FIG. 8 is a side elevational view of the invention as it appears when used for simultaneously supporting an ice fishing reel and a conventional fishing rod.
Figure 9:
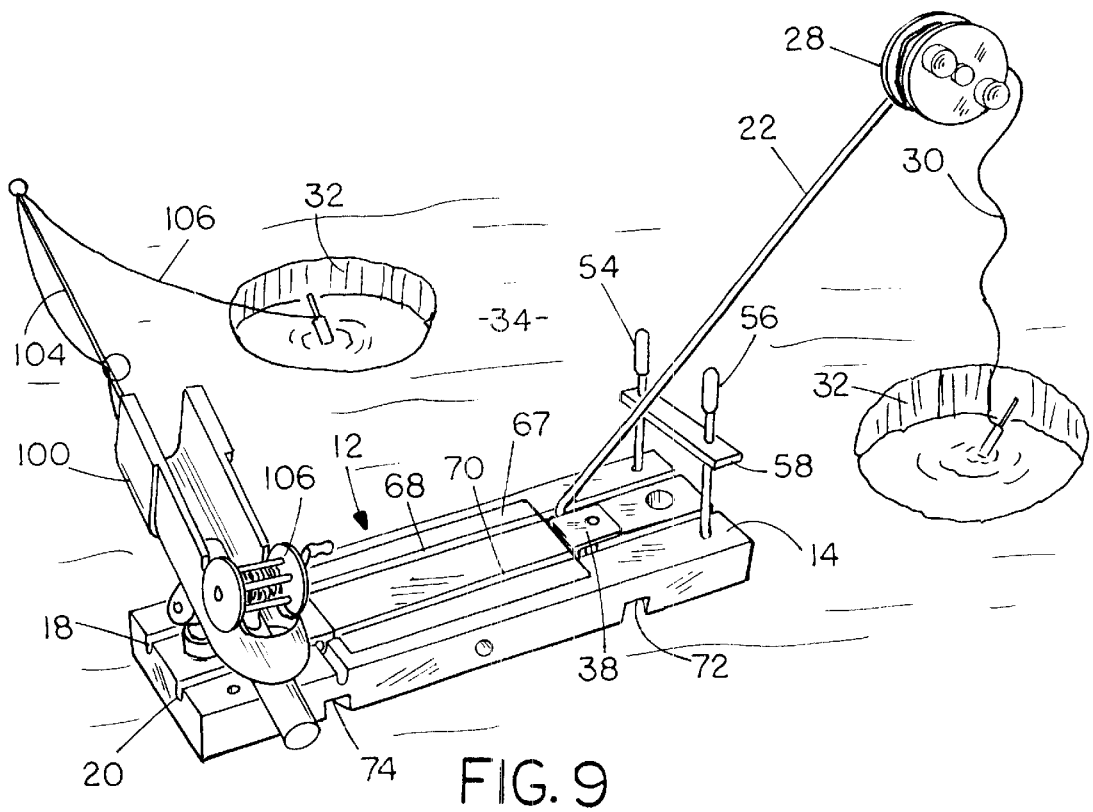
FIG. 9 is a perspective view similar to FIG. 8 with the conventional fishing rod in a different position.

Refer now to FIGS. 8 and 9 which illustrate a trough-shaped fishing rod holster 100 having a downwardly extending supporting post 102 inserted into the opening 42 at the left end of the base 12 so as to support the rod holster 100 a few inches above the upper surface 14 of the base 12. The rod holster 100 is usually held at an oblique angle to support an ordinary fishing rod 104 and reel 106 with its distal end elevated so that the fishing line 106 can extend either over the top of the reel 28 as shown in FIG. 8 and thence through the hole 32 in the ice 34 or, if desired, the fishing line can extend downwardly in a loop shown by dotted line 108 so as to pass through a sensor 110 of any suitable known construction, such as between a pair of normally closed electrical contacts that are wired by conductors 112 to a battery-operated electric light 114 and/or buzzer to signal the presence of a fish when the loop 108 is pulled from between the contacts of the sensor 110.

In FIG. 9 the rod holster 100 is shown rotated about a vertical axis aligned with the socket 42, e.g., toward the left side, to support the fishing rod 104 so as to extend the fishing line 106 into a hole 32 off to the left of the base 12. A separate fishing line 30 is entrained around the reel 28, and in this case extends through a different hole in the ice.

Figure 10:
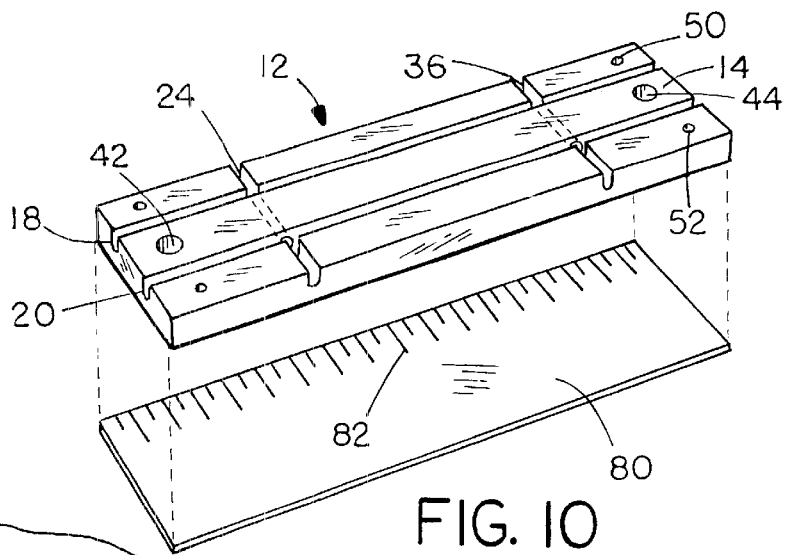
FIG. 10 is a perspective view of a simplified form of wooden base.

Refer now to FIG. 10 which illustrates a simplified, relatively low cost base 12 wherein the same numerals refer to corresponding parts already described. In this case the base 12 is economically constructed from a wooden plank about one inch thick and has no fishing tackle box. Removably mounted below the plank forming the base 12 is a table surface 80 with markings printed along one edge to provide a ruler 82 as already described. The table surface 80 can be removably attached to the bottom of the base 12 or can be loose, if desired.

In FIG. 11 the invention is shown in a vertical position secured to an interior wall 120 of a fish house 122 that includes a floor 124 with a rectangular opening 126 above the hole 32 in the ice. The base 12 is held in a vertical position with the rope 46 or other fastener as already described so as to position the reel 28 above the floor opening 126. The holder 58 again positions the reel-supporting arm 22 at the correct angle to properly place the line 30 in the desired location to extend through the opening 126. While a wooden base has been shown in FIGS. 10 and 11, it should be understood that the base 12 can, if desired, be formed from plastic resin as already mentioned in connection with FIG. 4, in which case the base 12 will be hollow as seen from below as shown in FIG. 4. The plate 80 (FIG. 2) can be placed below the base 12 to cover the hollow bottom of the base 12.

Refer now to FIGS. 12 and 13 which show the alarm 71 of FIG. 6 mounted on the spindle 84 and located in the opening 60. At the upper end of the alarm 71 is an electric light 132 which is wired by means of conductors 134, 136 to a radio transmitter 138 having an ON/OFF switch 140 in series with a battery 142 and a pair of normally closed contacts 144, 146 that form a sensor for the fishing line 30 positioned between them in the same manner as shown in FIG. 8. The transmitter 138 can also include a buzzer for providing an audible signal. Connected to the lower end of the alarm 71 is a bracket 133 having an axle 135 at its lower end, upon which the reel 28 is supported for rotation. The reel 28 is provided with a pair of cam members 28a which, as the reel rotates, are adapted to contact a switch 148 connected via wires 150, 152 in series with the battery 142 and transmitter 138 so that whenever the reel 28 rotates, the cam members 28a will repeatedly close the switch 148 so as to energize the transmitter 138 to provide a radio alarm for the user who has a receiver 139 tuned to the same frequency. The electric light 132 is also turned on by current supplied by the battery 142. If desired, contacts 144, 146 can be used as an alternative to switch 148 or both can be used together. If desired, the switch 148 can be a proximity switch of any suitable known constructions, and the cam members 28a in that case can be magnets or simply metal members which are able to actuate the proximity switch 148 when they come in close proximity to it in a manner known to those skilled in the art, thereby repeatedly actuating the transmitter 138 and light 132 to signal the fisherman that a fish has struck a lure at the end of fishing line 30.

Refer now to FIG. 12A. In FIG. 12A the alarm 141 is generally similar to the alarm 71 of FIG. 12 except that it is supported upon an integral folding tripod 143 with three pivots 143a supporting folding legs 145 which, during use, are placed on the surface of the ice adjacent the hole in the ice through which the body of the alarm 141 extends for supporting the reel 28 in the water below the ice hole 32. In this case, the alarm 141 has a vertical, hollow, cylindrical casing 139 containing an upright pushrod 137 that is mounted for vertical sliding movement within the casing 139. The pushrod 137 has a lower end 137a which extends from the bottom of the casing 139 in the path of the switch-operating cams 28a that, during operation, push the rod 137 upwardly when the reel 28 rotates, thereby operating the remote electrical switch 148 which is located above the surface of the water so as to energize the radio transmitter 138, the light 132 and, in this case, an audible alarm such as a buzzer 138a. The alarm 141 is turned on and off by a manual switch 132a. If desired, in the alternative, the lower end 137a of the pushrod 137 can be magnetic and, in that case, the cam members 28a are also made of a magnetic material so that during operation the proximity of magnetic cam members 28a will function to shift the pushrod 137 axially, thereby operating the switch 141. FIG. 12A shows the electric light 132 at the top of the alarm, the manual ON/OFF switch 132a, the radio transmitter 138, the pressure-actuated switch 148 which is operated by contact with the pushrod 137, and the buzzer and battery which are designated by the numeral 138a. The embodiment of FIG. 12A has the advantage of not needing an expensive water-immersible electrical switch as required in the embodiment of FIG. 12. It is also versatile in permitting the cam members 28a on the reel 28 to move the pushrod 137 either mechanically or by moving into proximity with its lower end 137a so as to magnetically shift the rod 137 axially for actuating switch 148.

As a supplemental or alternative form of alarm, the reel 28 can be provided with a rattle to provide a noise when the reel 28 rotates. The rattle can consist of one or more small compartments in the reel 28 containing one or two BB's which move to produce a rattling sound when the reel rotates. This will alert the fisherman if he is within earshot of the reel when the fish strikes.

Figure 14:
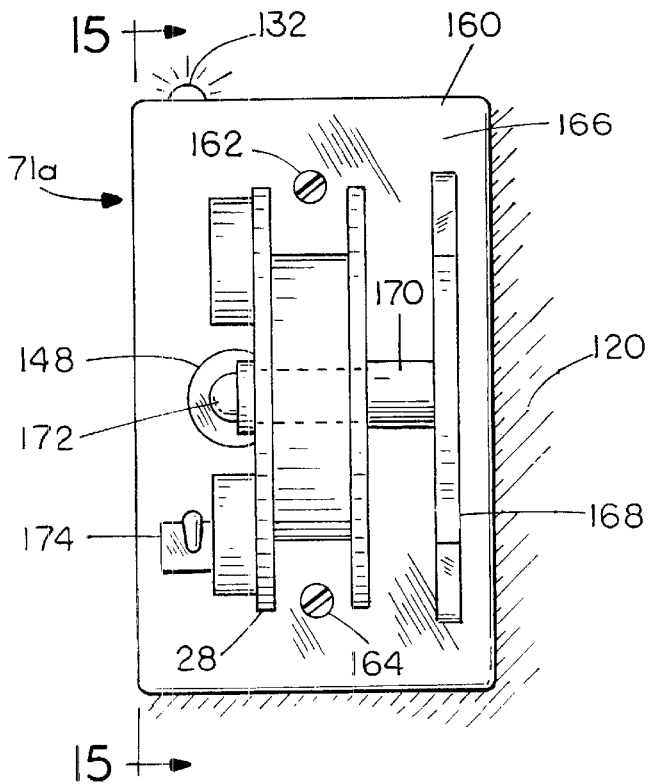
FIG. 14 is an elevational view of the reel connected to another form of alarm.
Figure 15:
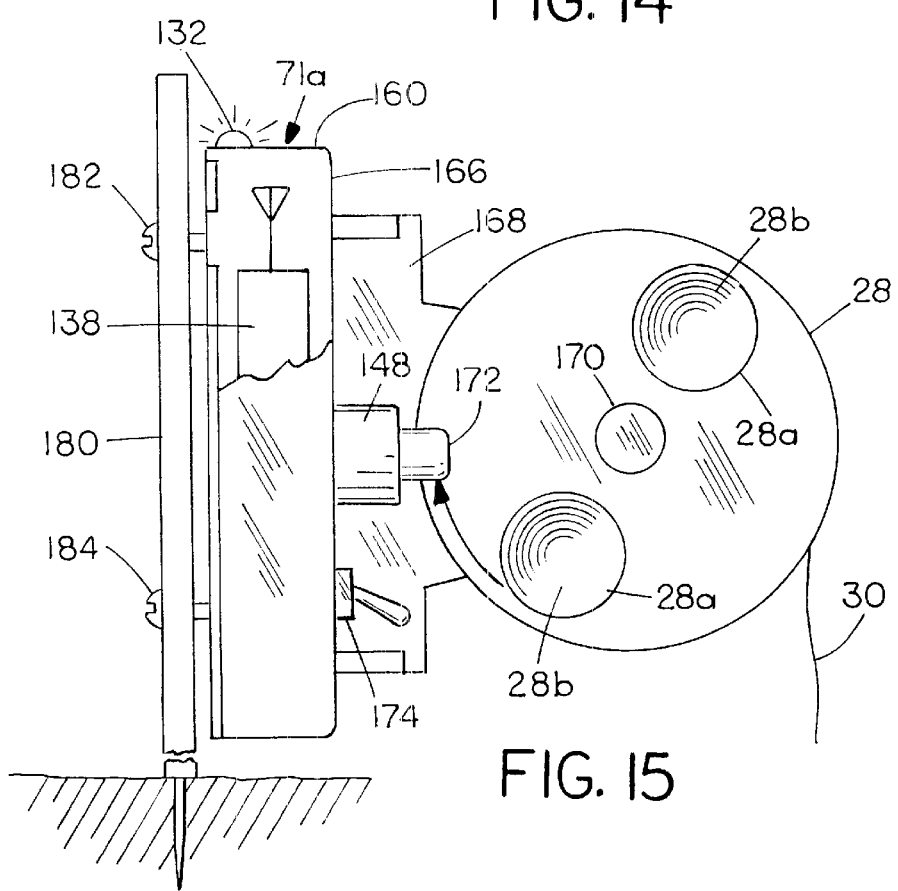
FIG. 15 is a side elevational view taken on line 15—15 of FIG. 14.
Figure 16:
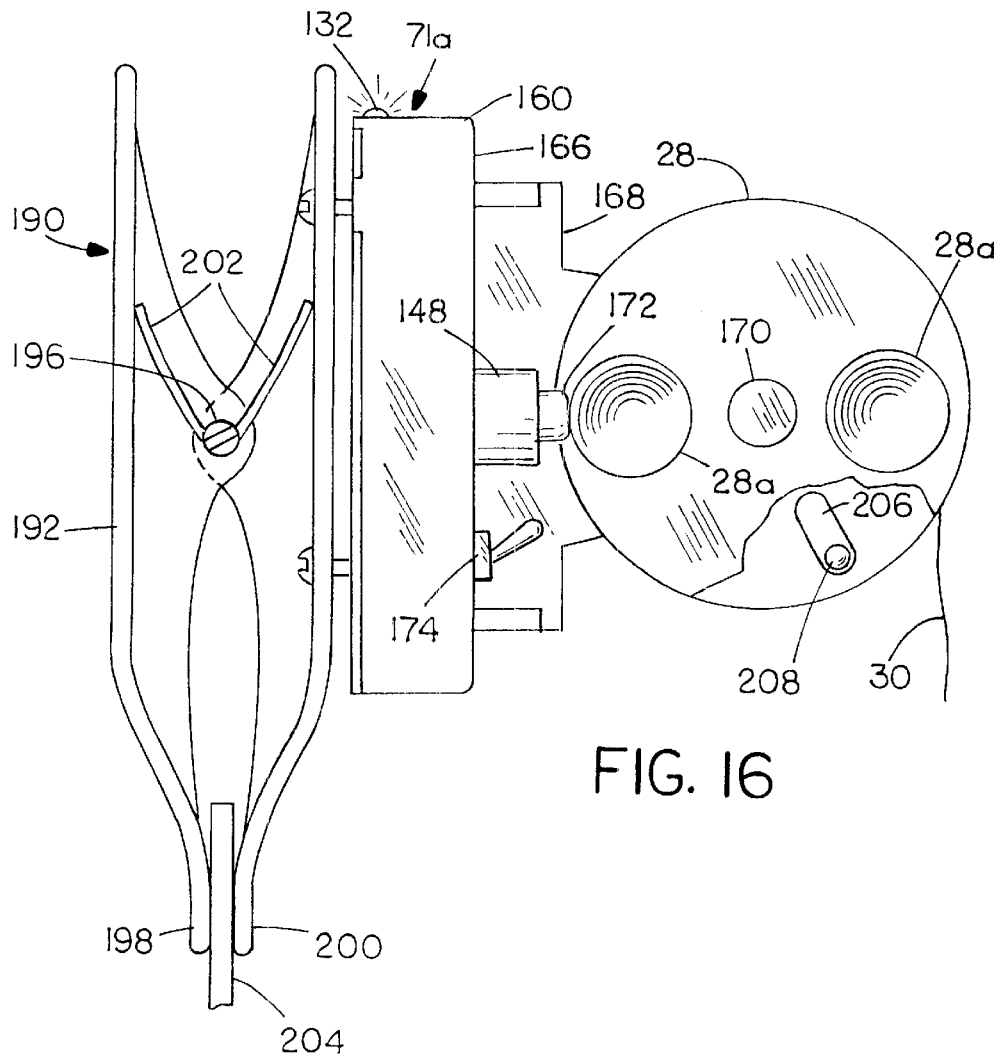
FIG. 16 is a view similar to FIG. 15 showing a different way of supporting the alarm.

FIGS. 14–16 show an alarm 71a that is similar to the alarm 71 already described wherein the same numerals refer to corresponding parts already described. The alarm 71a comprises a housing 160 containing a radio transmitter 138 (FIG. 15) wired in the same manner described in connection with FIG. 13 and is supported as shown in FIG. 14 by being connected to a base 120, e.g., a sheet of plywood or the wall of a fish house, by means of two screws 162, 164 with one side wall 166 in a vertical position. Connected to the side wall 166 is a reel bracket 168 on which is supported a spindle 170 for the reel 28. Each of the cam members 28a rotates in a circle so as to actuate a switch contact 172 of a switch 148 which is wired to the transmitter 138, as already described, and to an electric light 132. As shown in FIG. 15, the free end of each cam member 28a can be provided with a pocket 28b. The fisherman can place a finger in one of the pockets 28b to facilitate reeling in the fishing line 30. The switch 148 can be a mechanical switch with a moving contact or, if desired, a proximity switch in which case the cams 28a can be permanent magnets or simply made of metal. The switch 148 can be any suitable commercially available proximity switch of known construction capable of sensing the presence of the switch actuating cams 28a. As soon as a fish pulls on the line 30, the switch 148 will be actuated repeatedly as the cams 28a turn on the switch 148, thereby repeatedly actuating the transmitter 138 so as to send a radio signal to the receiver 139 which is carried by the fisherman. The transmitter 138 can be turned off and on with a toggle switch 174.

FIG. 15 also shows another kind of base or supporting framework. In this case the alarm 71a is connected by two screws 182, 184 to a base consisting of vertically disposed stake 180 which the fisherman has placed on the ice 34 next to one of the holes 32. Supporting the alarm 71a on the stake 180 is preferred when fishing without an ice house. The lower end of the stake 180 is provided with a sharp, downwardly extending metal point which as shown is buried in the ice to support the stake 180.

Refer now to FIG. 16 which illustrates another method of mounting the alarm 71a. In this case the alarm 71a is secured to a base comprising a normally closed, spring-operated clamp 190 which includes a pair of clamp arms 192, 194 that are pivotally connected together by means of a pivot 196 and a pair of opposed jaws 198, 200. The jaws 198, 200 are normally pressed together by a spring (the ends of which are shown at 202) coiled around the pivot 196 so that the jaws 198, 200 will grasp a solid object such as a stick or sheet of plywood 204 which is placed close to the hole in the ice. As already described, the switch 148 can either be a mechanical switch with a moving a contact 172 that is depressed repeatedly by contact with the cam members 28a or, if desired, can comprise a proximity switch which is repeatedly actuated by the close proximity of the cam members 28a as they pass the switch 148. If desired, the reel 28 can include a compartment 206 (FIG. 16) containing one or more ball bearings 208 which serve as a rattle when the reel 28 rotates to provide a further alarm signal to indicate a strike.

Figure 17:
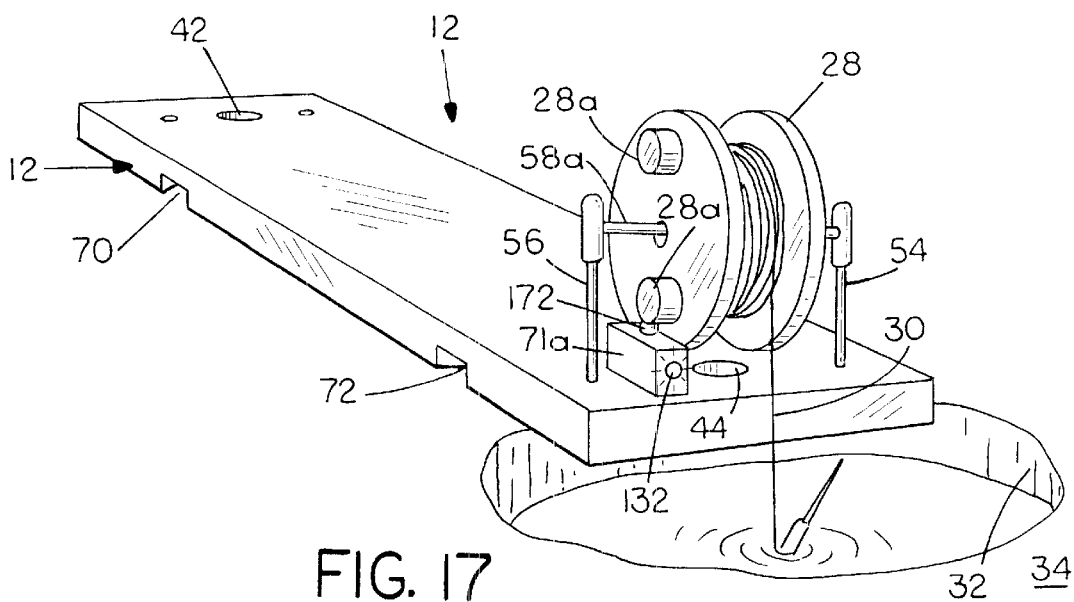
FIG. 17 is a perspective view of the invention with the reel secured to one end of the base.

Refer now to FIG. 17 which illustrates the versatility of the invention by showing another way in which the invention can be set up for operation. In this case the base 12 is generally the same as already described in connection with FIG. 10 except that the slots 18, 20, 24 and 36 have been dispensed with. The reel 28 in this case is supported for rotation upon a horizontal spindle 58a which is connected at its ends between the upright supporting posts 54 and 56 (mounted as already described in sockets adjacent one end of the base 12) so as to extend upwardly from the planar upper surface of the base 12 with one end of the reel 28 overhanging the right end of the base 12 so that the fishing line 30 extends downwardly through the ice hole 32 into the water below the reel 28. FIG. 17 also shows how the alarm 71a is placed just below the reel 28 and is preferably attached to the base 12, e.g. by means of screws (not shown), with the switch 172 facing upwardly in the path of the cam members 28a as the reel 28 rotates so that the alarm 71a (already described) is actuated by the rotation of the reel 28. Consequently, when a fish strikes the lure at the end of the line 30, the rotation of the reel 28 will energize the alarm 71a, thereby signaling the fisherman by means of the light 132, radio transmitter 138 or audible alarm such as a buzzer connected in series with the light 132.

Figure 18:
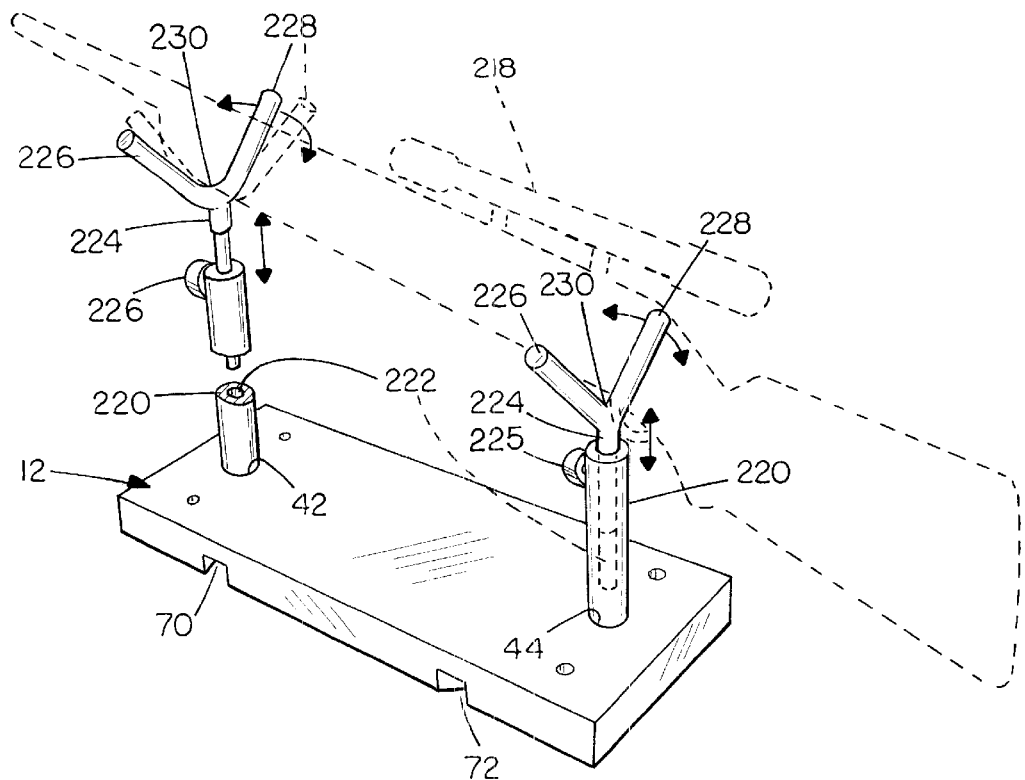
FIG. 18 is a perspective view of the invention in use for supporting a firearm.

FIG. 18 shows the further versatility of the invention by illustrating how the invention can be employed in other sporting activities, such as hunting. In this case a vertical tubular post 220 is supported in each of the sockets 42, 44 in an upright position with a Y-shaped gun support 224 slidably mounted therein and secured in position by means of a set screw 225 which is threaded through the wall of the post 220, enabling the gun support 224 to be raised and lowered or rotated about a vertical axis to any desired position for supporting an article such as a rifle or other firearm 218. Each gun support 224 is provided with diverging inclined arms 226, 228 which form a recess therebetween at 230 for supporting the article 218. While the arms 226, 228 have been shown for simplicity to be of tubular configuration, if desired, each of the arms 226, 228 can have a flat upper surface to provide a trough-like support for the firearm 218. If desired, a sandbag can be placed in the Y-shaped support 224 to steady the firearm 218. FIG. 18 illustrates how the versatility of the invention can add to its sales appeal by pointing out to the sportsman that the invention can be employed in other sports such as hunting as well as for fishing.

Figure 19:
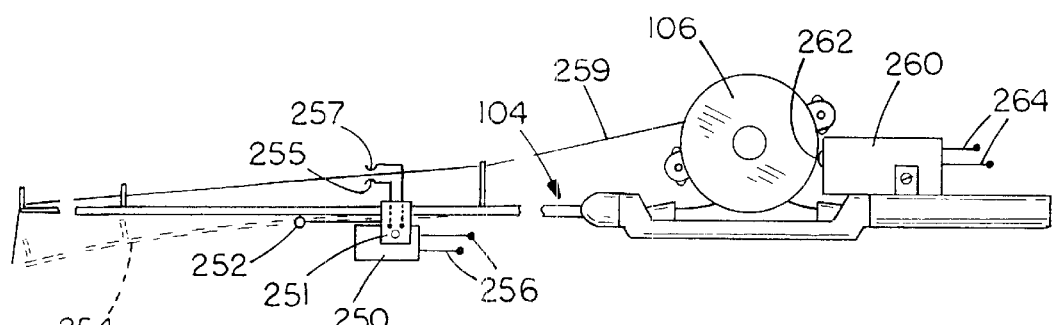
FIG. 19 is a side elevational view of an alarm in accordance with the invention mounted on an ordinary fishing pole.

Refer to FIG. 19 which illustrates how the invention can be employed with an ordinary fishing pole or rod 104 which is provided with electrical switches for actuating any of the alarms, such as the alarm 71, 71a (FIGS. 12A, 13 and 14–17). In this case the conventional fishing rod 104 has a reel 106 of standard construction with a line 259 that extends toward the left in the figure through the eyes to the left end of the rod 104. Securely fastened to the rod intermediate its ends is an electrical switch 250. The electrical switch 250 can be a small, easily operated switch such as a micro-switch having a switch arm 252 that extends to the left with its end in contact with the lower surface of the rod 104. The downward bending of the rod (as shown by dotted lines 254) resulting from a fish on the line causes the switch arm 252 to be forced downwardly, thereby closing the switch 250 to allow current to pass through the conductors 256, which are connected to the conductors 150, 152 in place of the switch 148 of FIG. 13, energizing the alarm 71. Alternatively, the switch 250 is provided with a pair of resilient, normally closed, electrical contact arms 255, 257 positioned above the rod 104 and connected permanently to the conductors 256. To use the contact arms 255, 257, the line 259 is placed between the contact arms to hold them apart. However, tension produced by a fish on the line 259 will remove the line 259 from between the contact aims 255, 257, thereby closing the circuit through the conductors 256 so as to energize the alarm 71 or 71a. An alternative switch 260 is securely fastened to the handle of the fishing rod 104 adjacent the reel 106. In this case the switch 260 has a switch contact 262 that is actuated in any suitable manner by the rotation of the reel 106, e.g. by having a cam or proximity member similar to 28a on the reel 106 so as to close the switch 260 when the reel rotates, thereby completing an electrical circuit through conductors 264 which are connected to the conductors 150, 152 in place of the switch 148 of FIG. 13, thereby energizing the alarm 71 or 71a. FIG. 19 illustrates in this way how the alarm 71, 71a of the invention can also be used with a standard fishing rod and reel to further increase its sales appeal and utility in different fishing applications.

The invention has many advantages over the prior art. It is inexpensive, reliable, rugged in construction, and can be used to support the reel 28 in any of several positions relative to the base 12 as shown in FIGS. 5–7. The arm 22 supporting the reel 28 can be placed at a steep angle as shown in FIG. 5 so that, with the arm holder 58 formed from rubber or other resilient material, the reel 28 will bounce up and down on its support at 58 more easily than when mounted as shown in FIG. 6 so as to provide the greatest possible swimming action for the lure. Alternatively, the arm 22 can be placed at a low angle or in a horizontal position as shown by dotted lines in FIG. 6 within one of the slots 18 or 20 so that the reel 28 can be held rigidly in place as may be required under some fishing conditions.

The invention also provides an effective alarm to indicate that there has been a strike on the line. The reel 28 can be mounted either on the alarm 71 or 71a, at the end of the arm 22, within the opening 60, or on a separate support arm 90 to best meet the fisherman's needs under different fishing conditions that are encountered. In addition, the invention provides a table surface 80 for the convenience of the fisherman, a scale 82 for measuring the length of the fish caught, and a cushion 76 to serve as a seat for the fisherman when the base 12 is mounted on top of a standard plastic pail 74. The openings 42, 44 provide means for securing the base 12 in different positions. The base can be placed on the floor of a fish house 122, hung vertically on the wall 120 of the fish house 122 as shown in FIG. 11, placed on the ice 34, the ground next to a lake or ocean, or on the pail 74 when needed as a seat. The openings 42, 44 also serve as sockets for mounting a holster 100 for a conventional fishing rod 104 (FIGS. 8 and 9) or for holding yokes for supporting a firearm used in hunting or trap shooting. Thus, the invention can be used simultaneously as a reel holder for an ice fishing reel 28 and for holding a conventional fishing rod 104. Either of the alarms 71 or 71a can be removed when not used for fishing and used for other purposes such as hunting or even as a burglar alarm by placing the fishing line 30 across the inside of the door of the fish house 122 to indicate that the door of the fish house has been opened. When used for deer hunting, the fishing line 30 can be strung across a deer trail so that a tug on the line 30 will indicate the presence of a deer either by actuating the transmitter 138 or the light or both. The invention also provides a convenient tackle box for lures and other fishing paraphernalia.

Figure 20:
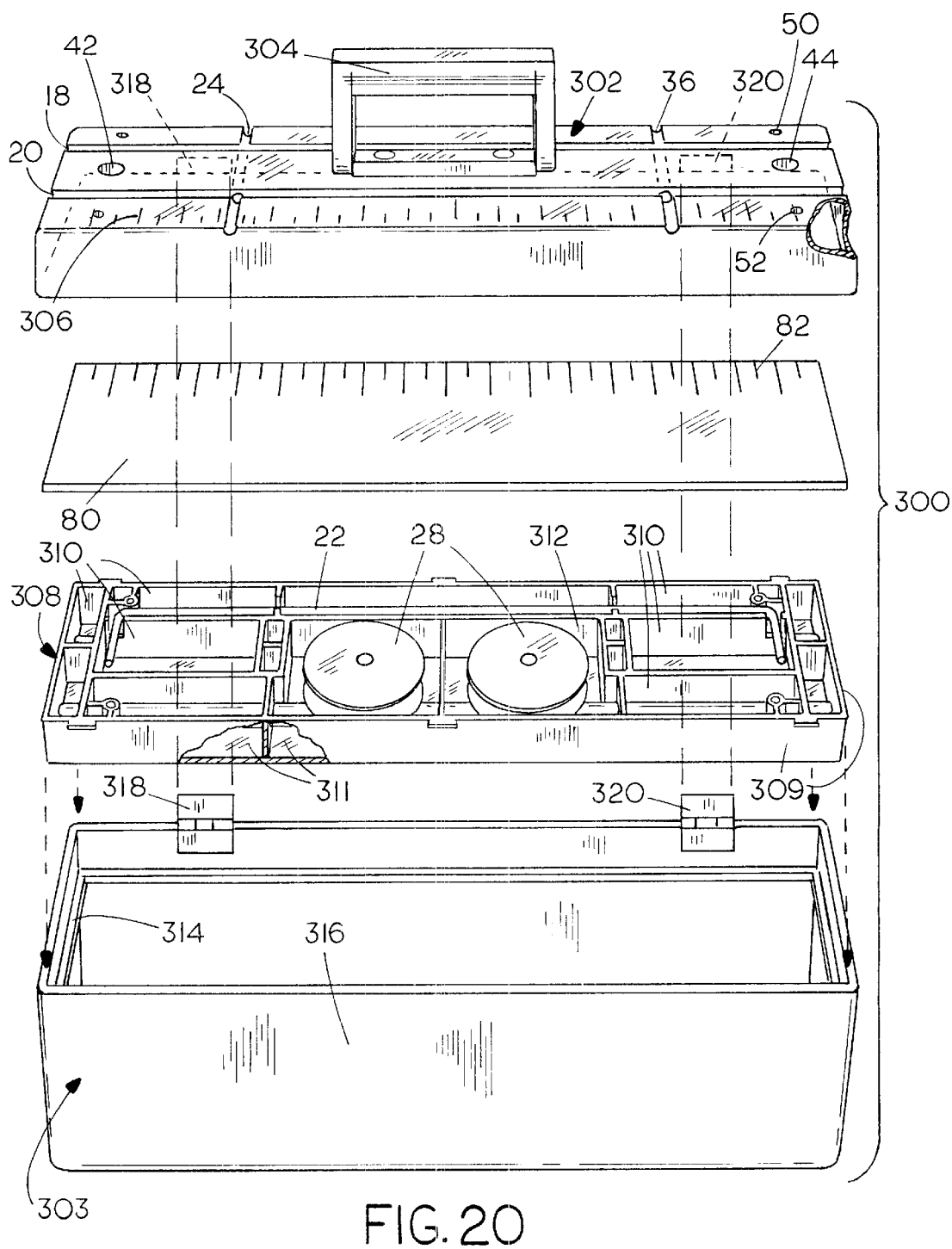
FIG. 20 is an exploded perspective view, partly broken away, of another form of the invention.

Refer now to FIG. 20 wherein the same numerals refer to corresponding parts already described. Shown in the figure is a tackle box 300 in which the planar base used for supporting a fishing reel in this case comprises a cover 302 for the tackle box 300. The tackle box 300 also includes a lower body portion 303. The tackle box cover 302 which serves as a planar base for supporting one or more of the reels 28 includes the grooves 18, 20, 24, 36, sockets 42, 44 and other components already described. In addition on the top 306 of the tackle box cover 302 is mounted a handle 304 which is pivotally connected at its lower end to the top 306 of the tackle box cover 302 to enable the tackle box 300 to be easily carried. As shown at the right in FIG. 20, the cover 302 is hollow and comprises the top wall 306 with four integral side walls that extend downwardly from the side edges of the top wall. The cover 302 has been broken away at the right so that the side and top walls as well as the hollow structure of the cover 302 can be clearly seen.

Inside the tackle box 300 is a multi-compartmented tray 308 having a plurality of compartments 310 for holding fishing tackle. The tray 308 is sized and constructed to hold at least one reel supporting arm 22 and at least one reel 28. The lower body portion 303 of the tackle box is provided with an internal upwardly facing ledge 314 for supporting the tray 308 which is recessed in the lower body portion 303 of the tackle box 300 when the tackle box is assembled. The cutting board 80 which can be provided with a printed scale 82 for measuring the size of a fish, is mounted within the tackle box 300 above the tray 308 and below the cover 302. The cutting board 80 is preferably recessed into the tray 308 to hold larger items of fishing tackle in the proper compartments. The cover 302 and the lower body portion 303 of the tackle box 300 are connected by means of a pair of hinges 318, 320 which are shown separated in FIG. 20 so that all of the components can be clearly seen. During use, the tackle box 300 is carried to the fishing location by means of handle 304. The reels 28 and support arms 22 are then removed from the tray 308 and mounted for use as shown, for example, in FIGS. 1, 5, 6 or 17. The planar base comprising a cover 302 can be used either while mounted on the tackle box 300 as shown or, if desired, the hinges 318, 320 can be separable hinges of any suitable known construction enabling the cover 302 to be removed from the tackle box 300 and used separately.

Refer now to FIGS. 21-31 and especially FIGS. 21-24 which illustrate additional features of the invention wherein the same numerals refer to corresponding parts already described. In this embodiment, the lower body portion 303 of the tackle box 300 is supported in a transport cart 400 having a bottom wall 402, four upright side walls 404-407, a pair of wheels 408 mounted for rotation at one end, and an extendible wire handle 410 at the other end which can be withdrawn in the direction shown by the arrow in FIG. 23 so that it projects about 18 inches to two feet from the nearest side wall 407, allowing the user to easily pull the tackle box 300 behind him with the wheels 408 on the ground supporting the weight of the tackle box. The handle 410 is normally recessed within a pair of laterally spaced apart, parallel, horizontally extending channels 412 and 414 on the bottom of the cart 400. The cart 400 is also provided with mounting means such as a pair of laterally extending, circular, downwardly opening grooves 411, 413 to enable the cart to be mounted on top of a standard plastic pail (FIG. 1) which is itself not part of the invention.

Figure 23:
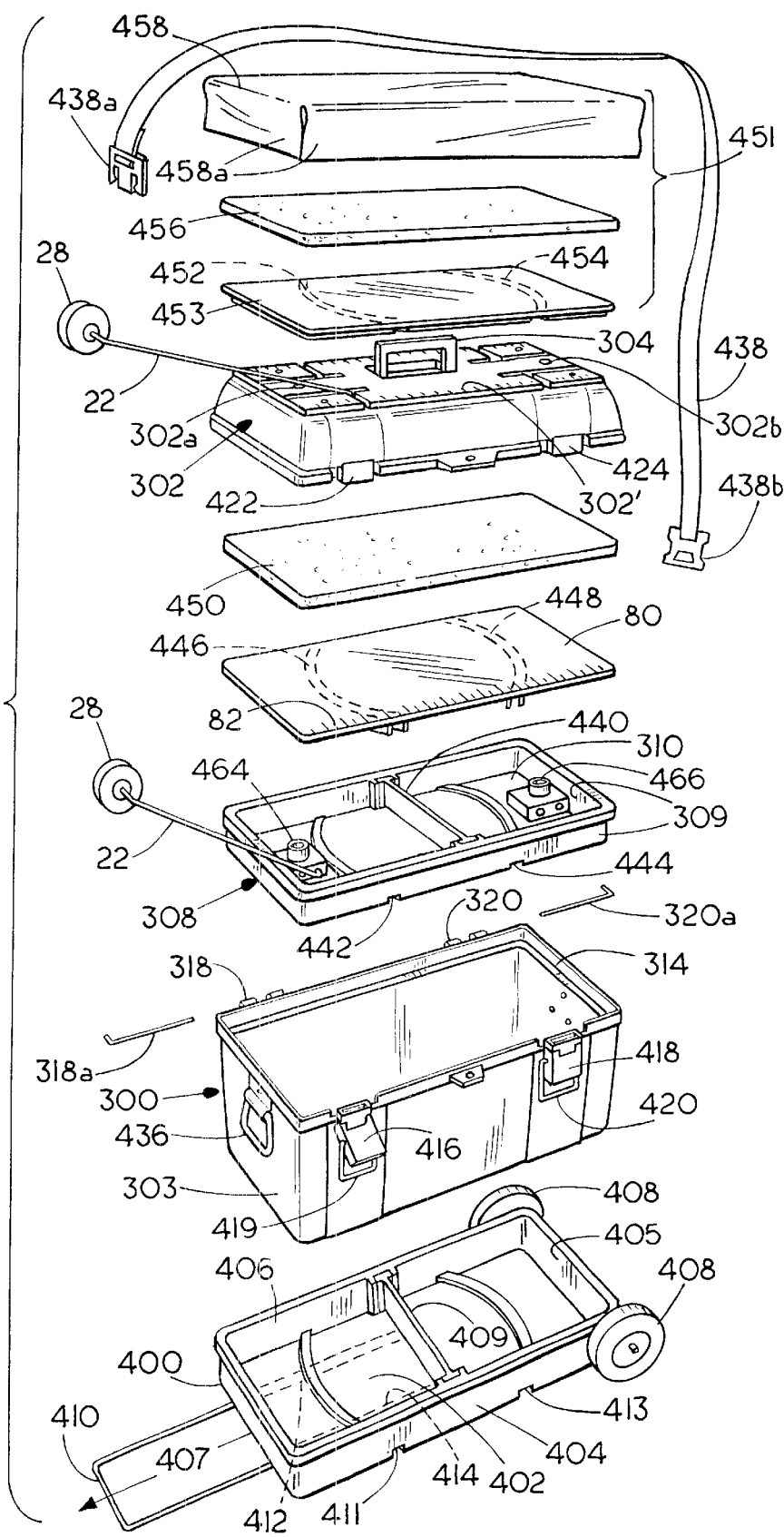
FIG. 23 is an exploded front perspective view of the invention on a somewhat reduced scale relative to FIGS. 21 and 22.
Figure 26:
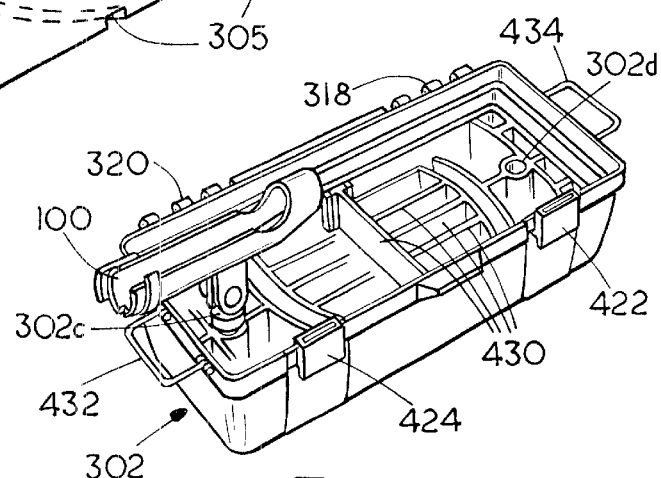
FIG. 26 is a bottom perspective view of the tackle box cover.

To hold the cover 302 in place, the tackle box 300 is provided with a pair of toggle-style clasps 416, 418 of suitable known construction having wire clasp members 419 and 420 which engage projections 422, 424 on a corresponding lower edge of the cover 302. The hinges 318, 320 described above in connection with FIG. 20 are in this case provided with manually removable hinge pins 318a and 320a that allow the cover 302 to be entirely removed and inverted as shown in FIG. 26 so that it, itself, can be used as a support for various articles, e.g., the holster 100 described above or other articles, and can be provided with internal partitions 430 which form a number of chambers for storing fishing tackle and other articles. The cover 302 can also be provided with ruler markings 302' along its upper edges for measuring fish (FIG. 23). Optionally, if desired, the hinges 318, 320 can be replaced with toggle-action clasps similar to 416 and 418 or with other fasteners. In an optional embodiment, the wheels 408 are mounted for rotation directly on the lower body portion 303 of the box 300. Thus, for example, in this embodiment the cart 400 of FIG. 21 can be integral with and comprise the bottom of the box 300 so that the wheels 408 consequently are mounted for rotation directly on the box 300.

The inside of the cover 302 also has sockets 302a and 302b for supporting articles such as a fishing rod holster 100. The top of the cover 302 is provided with transverse passages similar to the passages 26 (FIGS. 1 and 2) to receive the lower end portion 22a of reel support arm 22. The ends of the cover 302 can be provided with optional hinged bails 332 and 334 to facilitate carrying the cover 302.

The bottom body portion 303 of the tackle box 300 is provided with identical hinged bails 436 (only one of which is shown in the figures) at each end to which are attached a leather carrying strap 438 having metal fasteners 438a and 438b at its ends that connect the strap 438 to the bails 436. If desired, the tackle box 300 can also be provided with integral lip-style carrying handles at each end or on the sides. Alternatively, the tackle box 300 can be conveniently carried by means of the pivoted handle 304 on top of the cover 302. The tackle box 300 is also provided with connecting means, such as longitudinally spaced apart, laterally extending, downwardly opening circular grooves 417, 419 similar to those described above to enable the tackle box 300 to rest securely on top of a supporting article such as a pail (not shown).

Inside the tackle box 300, on the ledge 314, rests the tray 308 described above which serves as a tackle receptacle and can be provided with one or more partitions such as a removable partition 440 as well as two downwardly opening circular support grooves 442, 444 allowing it to be mounted on a plastic pail or other article.

The cutting board 80 already described includes a measuring scale 82 along one edge, as well as downwardly facing support mounting means such as grooves 446, 448. A cushion 450 comprises a rectangular section of resilient sheet material such as foam rubber or foam plastic which rests upon the cutting board 80 beneath the cover 302 when the tackle box 300 is assembled to prevent the tackle from raffling and to cushion the contents of the box.

Above the cover 302 is provided a seat assembly 451 formed from three components which can, if desired, be bonded together, e.g. by means of an adhesive. The seat assembly 451 includes a rectangular support plate 453, a cushion 456 formed, for example, from a sheet of foam rubber or plastic, and a flexible upholstery overlay 458. The cushion 456 comprises a rectangular sheet of the same shape as the supporting plate 453, while the overlay 458, which can be formed from a sheet of flexible vinyl upholstery or leather, has four side wall portions 458a (only two of which are shown) that extend downwardly when the unit is assembled so as to enclose the side walls of the cover 302. The plate 453 can also be used as a fish cleaning board or table counter.

Figure 21:
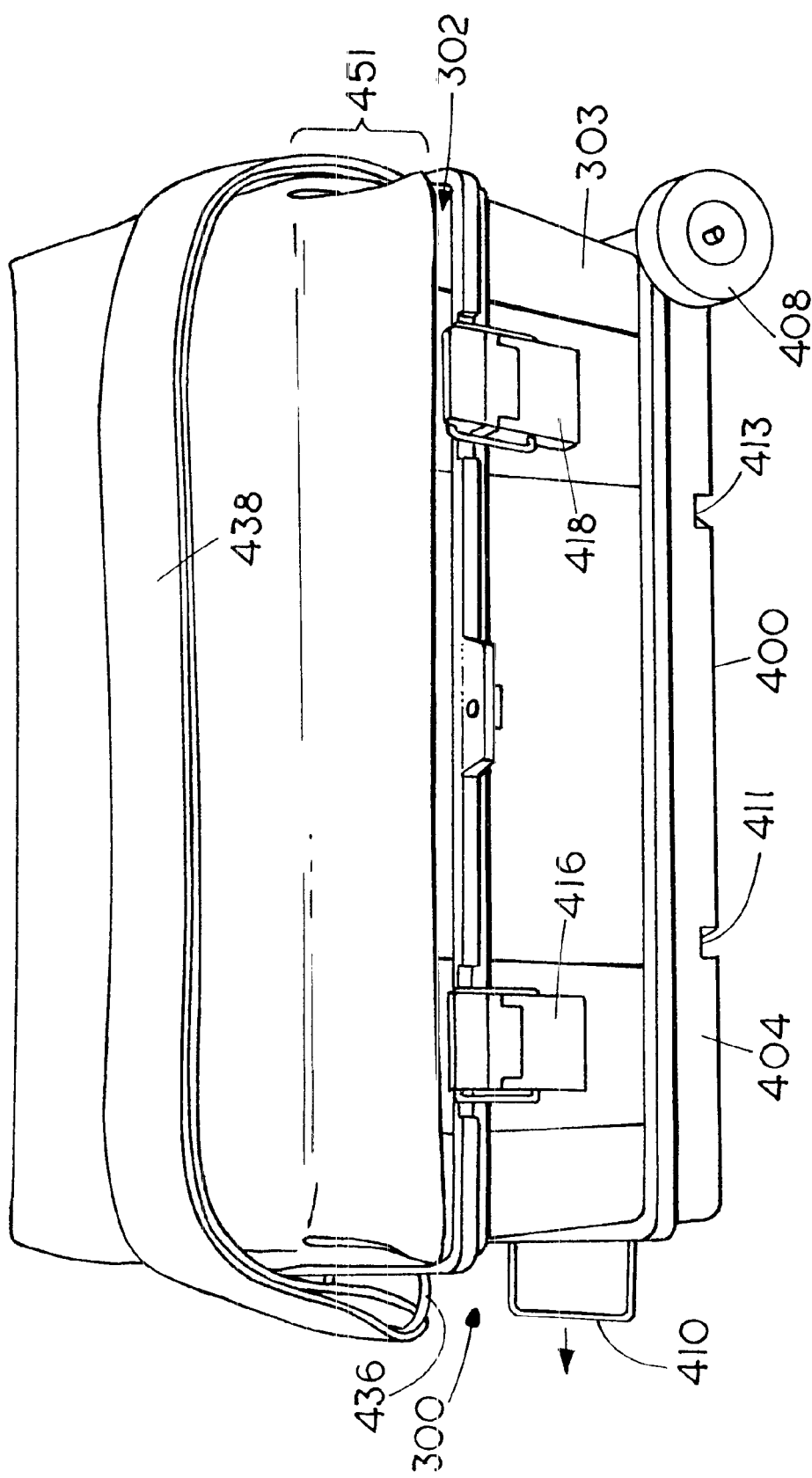
FIG. 21 is a front perspective view of a tackle box and transport cart in accordance with another form of the invention.
Figure 22:
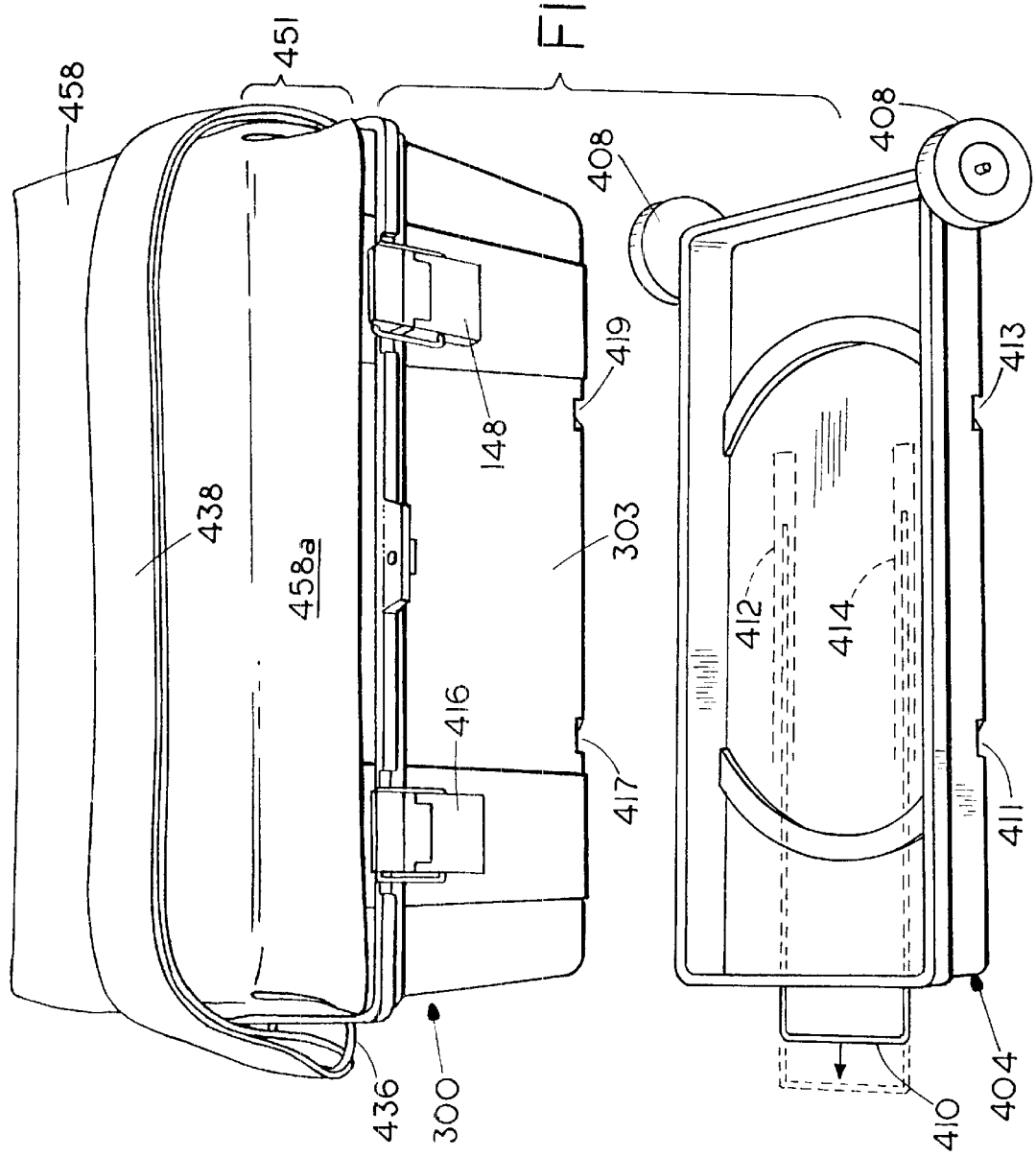
FIG. 22 is a perspective view of the tackle box of FIG. 21, with the tackle box elevated above the transport cart.
Figure 24:
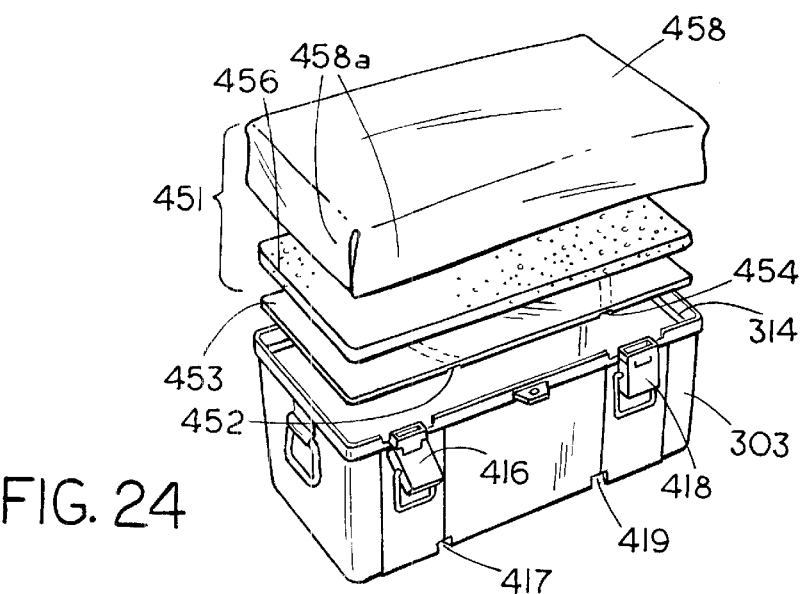
FIG. 24 is a front perspective view of a tackle box of FIGS. 21–23 showing an optional mode of assembly.

Refer now to FIG. 24 which shows how the seat assembly 451 can be placed, if desired, directly on top of the bottom portion 303 of the tackle box 300 instead of on the cover 302 with the support plate 453 recessed into the upper portion of the tackle box and supported along its edges by means of a shoulder 314. Alternatively, the entire seat assembly 451 can be placed on top of a pail (FIG. 1) such as that already described by placing the mounting means, in this case the downwardly facing opening grooves 452, 454 on the upper edge of the pail or other supporting article for elevating the seat assembly 451. Thus, the seat assembly 451 can be used in any of several ways. It can be placed on top of the entire tackle box 300 as shown in FIGS. 21 and 23 or, alternatively, on top of just the lower portion 303 of the tackle box 300 (FIG. 24) or, if desired, on top of a pail or other supporting article, or directly on the surface of the ice or the floor of a fish house (not shown).

Figure 25:
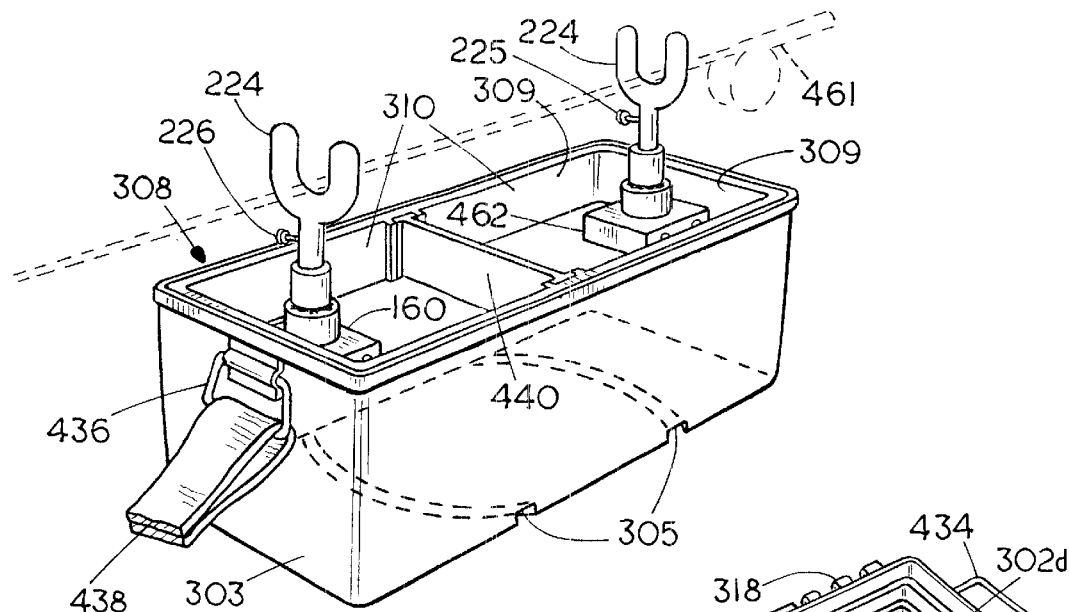
FIG. 25 is a perspective view of the tackle box with forked supports mounted for holding an article.

The tray 308 (FIGS. 23 and 25) is provided with one or more partitions such as the central removable partitions 440 to divide it into two or more compartments 310. At each end of the tray 308 are provided upwardly extending integral mounting bases 460, 462 that have vertical sockets 464, 466 (FIG. 23) in which the lower ends of forked supports 224 are mounted (see also FIG. 18). The forked supports 224 provide two horizontally spaced apart, open topped, support means at the same elevation for holding any kind of sporting article such as a fishing rod as shown in FIG. 25 or even a hunting rifle or spotting scope. Thus, while the forked support 224 has been shown supporting a fishing rod and reel, it can also be used to support other articles such as a shotgun or hunting rifle, and the position of each can be adjusted vertically by means of set screws 225 and 226.

Each of the mounting bases 460, 462 is also provided with two horizontally disposed, longitudinally spaced apart, laterally extending cylindrical holes which serve as receptacles for receiving the lower end portion 22a of the reel supporting rod 22 at the upper end of which the reel 28 is rotatably mounted (FIG. 23). Thus, when the tackle box 300 is open, the reel 28 and rod 22 can be supported on the tray 308 in any of four locations. The rod holder 22 can be secured to either mounting base 460 or 462 close to its outer edge or near its inner edge by selecting the inner or outer receptacle.

FIG. 26 shows that the inside of the cover 302 has vertical sockets 302c and 302d for mounting either holster 100 or the of supports 224 shown in FIG. 25.

Figure 27:
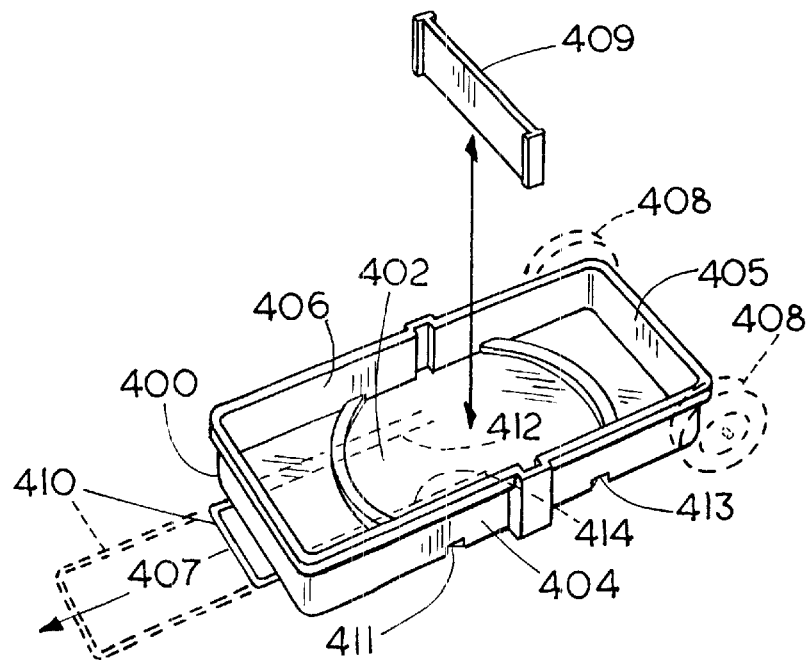
FIG. 27 is a perspective view of the transport cart according to the invention.
Figure 28:
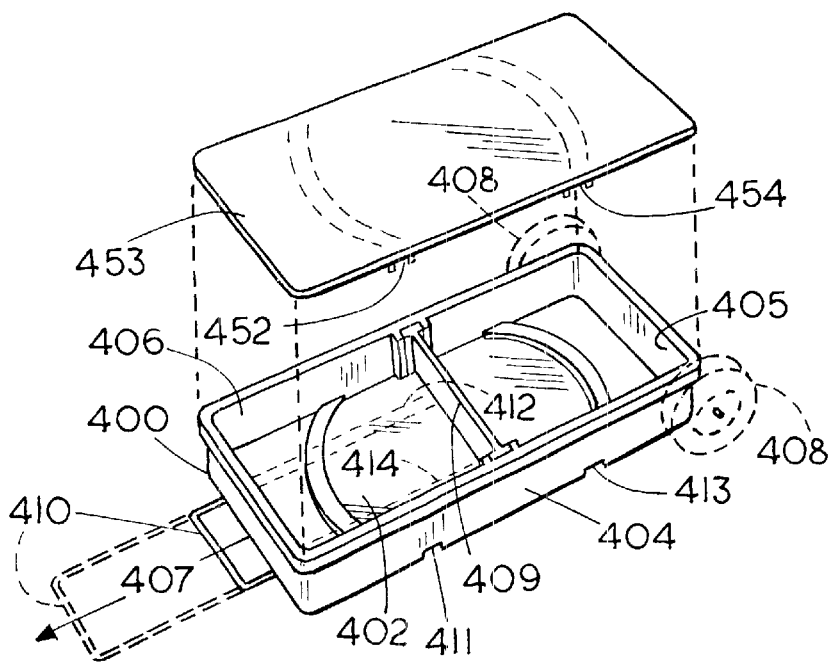
FIG. 28 is a view similar to FIG. 27 showing a cutting board being placed on top of the transport cart.

FIG. 27 shows how a transversely extending upright partition can be removably supported in the transport cart 400 once the tackle box 300 is removed. The cart 400 can then be used for storage purposes, if desired. FIG. 28 shows how the support plate 453 of the seat assembly 451 can be placed on top of the cart 400 so that the cart 400 can be used as a supporting base for the seat 451.

Figure 29:
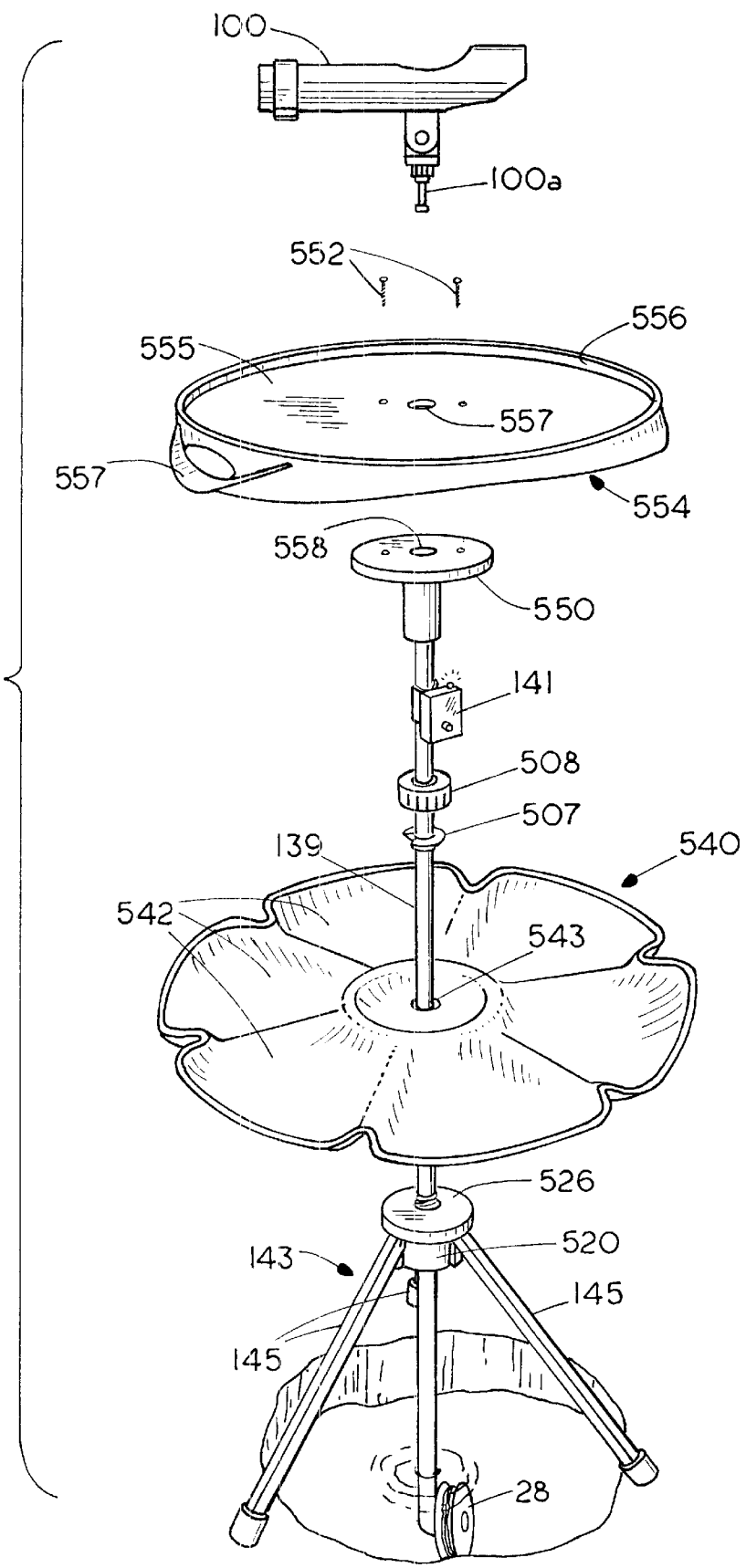
FIG. 29 is an exploded perspective view of the reel-supporting tripod of the invention.
Figure 30:
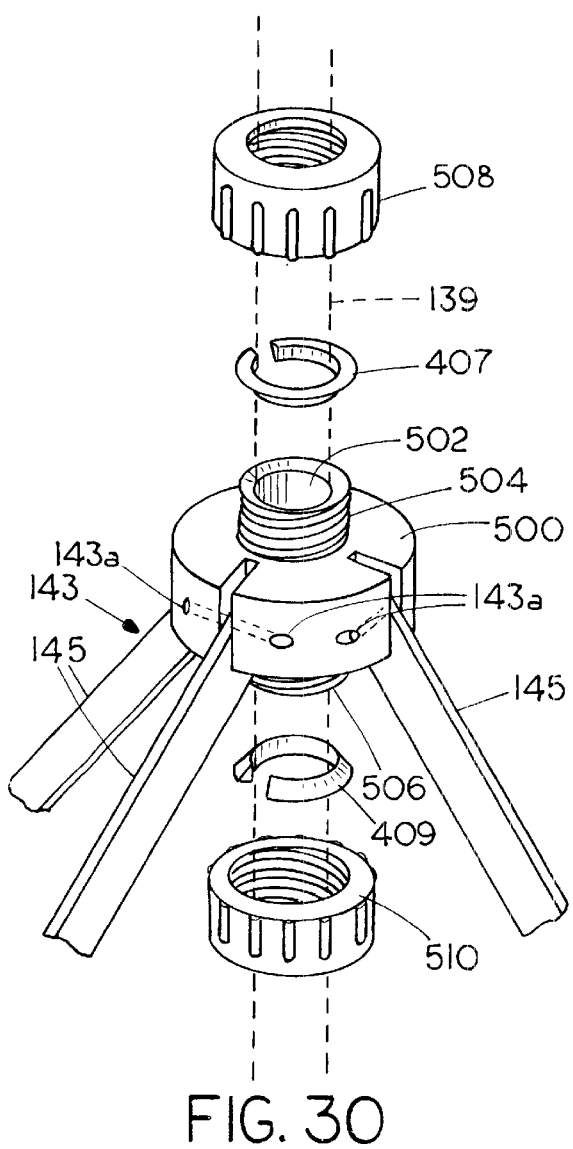
FIG. 30 is an enlarged perspective view of the tripod supporting sleeve of FIG. 29.
Figure 31:
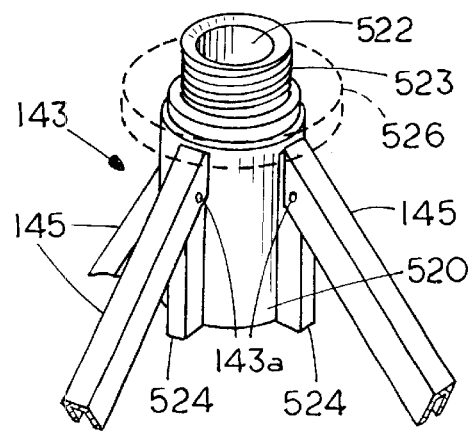
FIG. 31 is a view similar to FIG. 30 of another tripod supporting sleeve.

The reel 28 can be supported in other ways as shown in FIGS. 29–31. The cylindrical casing or tube 139 has already been described for supporting the reel 28 beneath the tripod 143 (FIG. 12A). In FIGS. 29–31, however, the cylindrical casing or tube 139 is longer and can typically be about 18 inches to three feet long so that it extends upwardly a considerable distance above the supporting tripod 143 which is placed over the ice hole during use. The tripod 143 in this case comprises three collapsible legs 145 which are pivotally secured to a sleeve 500 by means of the pivots 143a described above. The sleeve 500 has a central vertical bore 502, which can slide easily on the tube 139, and has upwardly and downwardly projecting threaded extensions 504 and 506. During use, the sleeve 500 is slid up or down on the tube 139 until the proper position is reached and then is clamped in place by means of upper and lower threaded collars 508 and 510, respectively, which are screw-threaded onto the extensions 504 and 506 so as to force C-shaped flexible retaining wedges 507 and 509, which can be formed from plastic material, tightly against the tube 139 to lock the sleeve 500 in place. The top and bottom of the threaded extensions 405, 406 are provided with conical upper and lower edges to apply pressure on the retaining wedges 507 and 509 as the collars 508 and 510 are tightened. Other means for locking the sleeve 500 on the tube 139 will be apparent to those skilled in the art. The reel 28 of FIG. 29 is connected to the alarm 141 as described above, either by means of an electrical conductor (not shown) or by other actuator means such as the push rod 137 (FIG. 12A) or by means of the switch 148 of FIG. 12 which consists of either a mechanical switch or a proximity switch that is repeatedly actuated by the proximity of magnetic cam members 28a as they pass the switch 148.

In FIG. 31 is shown a slightly modified form of the invention in which the sleeve 500 is replaced by a sleeve 520 with a central bore 522 that is slidably mounted during use over the tube 139. The sleeve 520 is provided with three longitudinally extending, vertically disposed, circumferentially spaced apart and parallel ribs 524 (only two of which are shown). The legs 145 of the tripod 143 in this case comprise channels which are each pivoted at 143a to one of the ribs 524 so that the tripod 143 can be collapsed. To act as a shield to cover the sharp upper edges of the legs 145 is a large flange or washer 526.

Supported on the tube 139 just above the washer 526 is a compartmented tray or pan 540 with a hole 543 at its center for the tube 139 and a plurality of radially arranged, upwardly opening compartments 542 for holding fishing tackle or other articles. The pan 540 can be secured in place by means of a collar 408 and circular retaining wedge 407 by tightening the collar onto the threaded extension 523. The signaling device 141 is mounted on the upper portion of the tube 139 and operates as described above. At the top of the tube 139 is secured a bracket 550 to which is attached by means of screws 552 a non-compartmented tray or pan 554 having a flat supporting surface 555 for holding articles such as fishing tackle with a circular, upwardly extending rim 556 around its edge. If desired, the holster 100, which has a downwardly extending mounting post 100a, can be supported in the center of the pan 554 by inserting the mounting post 100a through hole 557 and into a socket 558 in the bracket 550. The holster 100 can also be mounted on either the inside or outside of the cover 302 or on the tray 308. The tube 139 can also be used for supporting other articles such as a spotting scope. If desired, the tube 139 can be made of two telescoping sections with longitudinally spaced apart ruler marks on an inner section of the tube to indicate the elevation of the bracket 550. The tackle box 300, tray 308, cutting board 80, and transport cart 400 are preferably formed from injection molded plastic but can be made by other plastic molding techniques or can, in the alternative, be formed from metal if desired.

Thus, the tackle box 300 can be easily moved about on the cart 400 while supported by the wheels 408 and pulled by the handle 410. In addition, the tackle box 300 can serve as a cushioned seat through the provision of the seat assembly 451 which can be mounted either on the tackle box 300, the cart 400, directly on the floor, on the ice or on a pail or other elevated support, if desired. The tray 308 which holds articles such as tackle can also be used as a mount for the forked supports 224 as well as the reel 28 and its supporting rod 22. If desired, the pan 554 can be provided with one or more handles 557. The pans 540 and 554 can be used to hold various articles in the fish house, e.g., tackle, drinks, food, portable electronic equipment, etc. while the reel 28 is suspended at or below the surface of the water within the ice hole. Either the tray 308 or the bracket 550 can also be used to support rod holding holsters 100. The invention therefore provides a highly versatile tackle box which also serves as a seat and reel support as well as providing a reel-supporting tripod with pans for holding various articles so they are easily accessible in the fish house or, if desired, on the open ice if no fish house is used.

The present invention has multiple uses and can be applied universally in a variety of different fields, including fishing, hunting, shop or household use and the like. Various components of the invention can be completely separated from one another, i.e. the assembled unit can be broken down into parts and can be reassembled in other ways as shown in various figures. Because the invention allows for separate components to be removed and repositioned if desired, a sportsman using the invention is able to select those components and their placement best suited to the conditions of use or the application encountered whether it be fishing, hunting, shop use, household use, etc. The invention thus allows the separate removal or takedown of various components and the selection and reassembly of the components as desired to fit the circumstances of use. Moreover, the invention has trays or pans which serve as shelving for tackle and includes a tray having a cutting board above it that serves as a removable cover to hold tackle in the proper compartments.

The invention can be used for other things besides fishing tackle, such as holding household goods, drinks and food as a cocktail table, or as a fish cleaning surface or for holding a variety of other household items including tools and sewing items. The invention also provides the advantage of furnishing a fishing reel for underwater or above water use with mechanical or electronic proximity switching that permits the reel to be monitored by means of the alarm. The trays and pans can be held in a fixed position but are also removable so as to provide a collapsible tray or pan of a suitable size that serves as a tabletop. The alarm can comprise a radio transmitter which, together with a conventional receiver (not shown), allows easy monitoring of the reels. The invention also provides mounts for the holsters or other fishing holders, rests for fishing poles or hunting rifles, spotting scopes and the like. If desired, an optional carrying case or insulated cover (not shown) can be used to protect the ice hole from freezing.

Many variations of the present invention within the scope of the appended claims will be apparent to those skilled in the art once the principles described herein are understood.

What is claimed is:

1. A sporting apparatus, said sporting apparatus comprising:
   a mounting base for a fishing reel comprising a tackle box having a tackle box body and a cover,
   said box including a mounting means for removably supporting a fishing rod,
   a fishing reel mounted upon the apparatus,
   said cover being connected to the tackle box so that the cover can be raised to provide access inside the tackle box,
   a portable transport means upon which the tackle box is supported, said transport means including a handle, a pair of wheels and the handle is extendible, whereby the handle can be pulled outwardly from a recessed position to a deployed position where it can be grasped by a person walking with the cart containing the tackle box to move the tackle box while supported by the wheels and
   the tackle box has a removable tray and at least the lower portion of the tackle box or the tray has means for mounting the tray or tackle box on top of a pail or other supporting article such that the box or tray can be held in an elevated position on the article.

2. The sporting apparatus of claim 1 wherein the cover is removable and the cover has supporting means for holding a lower end portion of the fishing rod with the fishing reel rotatably mounted at an upper end of said rod.

3. The sporting apparatus of claim 1 wherein the cover is secured to the upper edge of the lower portion of a tackle box by at least one releasable clasp.

4. The sporting apparatus of claim 1 wherein the cover is hinged to the tackle box and the hinge is separable to allow the cover to be removed bodily from the lower position of the tackle box.

5. The sporting apparatus of claim 1 wherein a resilient seat assembly is removably mounted on top of the tackle box and the seat has a cushion therein.

6. The sporting apparatus of claim 1 wherein the sporting apparatus includes a pair of forked upwardly opening supports for supporting an article of sporting equipment.

7. The sporting apparatus of claim 1 wherein the apparatus has a removable tray, and at least one of the tray and the cover have mounting means for a fishing rod with a reel supported for rotation thereon.

8. The sporting apparatus of claim 1 wherein the transport means comprises supporting wheels mounted for rotation on the lower portion of the tackle box.

9. A sporting apparatus, said apparatus comprising, a tackle box having a cover and mounting means for supporting a fishing rod, a tripod, a reel-supporting tube is suspended vertically from the tripod, a fishing reel removably mounted upon the reel-supporting tube, said tube holding the reel in vertical alignment with an ice hole, an alarm attached to the tube for producing a signal when tension is applied to a fishing line wound on the reel, the tube has an electrical switch connected to the alarm and the apparatus is operatively associated with the electrical switch to turn on the alarm as the tension is applied to the line.

10. The sporting apparatus of claim 9 wherein the tube is slidably mounted within a sleeve connected to the tripod and a clamp is operatively connected to the tube for securing the tube to the sleeve.

11. The sporting apparatus of claim 9 wherein at least one pan is supported horizontally on the tube above the tripod for holding fishing tackle and other articles.

12. The sporting apparatus of claim 9 wherein the mounting means comprises a tripod, the reel is secured to a reel-supporting tube suspended vertically from the tripod for holding the reel in vertical alignment with the ice hole, and an alarm attached to the tube is operatively connected to the reel for producing a signal when tension is applied to a fishing line wound on the reel.

13. The sporting apparatus of claim 12 wherein the tube is slidably mounted within a sleeve connected to the tripod and a clamp is operatively connected to the tube for securing the tube to the sleeve.

14. The sporting apparatus of claim 9 wherein a plurality of pans are supported in a horizontal position on the tube above the tripod for holding fishing tackle and other articles.

15. The sporting apparatus of claim 9 wherein the apparatus has a removable tray, and the tray and the cover each have mounting means for the fishing rod with the reel supported for rotation thereon.

16. The sporting apparatus of claim 9 wherein the switch is a magnetic proximity switch and the reel has a switch operating comprising a magnet.

17. A fishing reel support apparatus suited for ice fishing, said fishing reel support apparatus comprising,
   a base for supporting a reel,
   said base having a top and a bottom,
   a reel-supporting arm,
   a fishing reel mounted for rotation on the arm that is capable of holding a supply of fishing line thereon which can be wound and unwound from the reel when the reel is rotated on the reel-supporting arm,
   the reel is mounted for rotation upon said arm and said arm is carried by the base and extends therefrom for supporting the reel for rotation on a horizontal axis,
   an alarm is supported on the apparatus and the reel is operatively associated with the alarm for energizing the alarm to indicate a strike on the fishing line, and
   the base has a central opening, the reel-supporting arm is supported in the opening with the reel suspended from the arm and the reel is operatively associated with a switch that is wired to the alarm for actuating the alarm when tension on a fishing line that is wound on the reel causes the reel to rotate.

18. The fishing reel support apparatus of claim 17 wherein the reel includes at least one member positioned to actuate the switch for energizing the alarm when the reel rotates, and the alarm includes visual, audible or radio signaling means.

19. The fishing reel support apparatus of claim 17 wherein the alarm includes a housing having an electric light thereon and a radio transmitter therein.

20. The fishing reel support apparatus of claim 19 wherein the housing of the alarm is supported on a base comprising a clamp having a pair of jaws for attaching the alarm to a solid object.

21. The fishing reel support apparatus of claim 17 wherein the switch is a proximity switch.

22. The fishing reel support apparatus of claim 17 wherein the alarm is a radio transmitter.

* * * * *